US010356792B2

(12) United States Patent
Tanaka

(10) Patent No.: US 10,356,792 B2
(45) Date of Patent: Jul. 16, 2019

(54) COMMUNICATION TERMINAL DEVICE, COMMUNICATION SYSTEM, COMMUNICATION METHOD COMPATIBLE WITH AT LEAST TWO COMMUNICATION SCHEMES

(71) Applicant: JVC KENWOOD Corporation, Yokohama-shi, Kanagawa (JP)

(72) Inventor: Jun Tanaka, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 55 days.

(21) Appl. No.: 15/592,284

(22) Filed: May 11, 2017

(65) Prior Publication Data

US 2017/0245258 A1  Aug. 24, 2017

Related U.S. Application Data

(63) Continuation of application No. PCT/JP2015/073240, filed on Aug. 19, 2015.

(30) Foreign Application Priority Data

Nov. 21, 2014  (JP) ................................. 2014-236657
Nov. 21, 2014  (JP) ................................. 2014-236658

(51) Int. Cl.
*H04W 4/00*  (2018.01)
*H04W 4/10*  (2009.01)
(Continued)

(52) U.S. Cl.
CPC ....... *H04W 72/048* (2013.01); *H04M 1/7253* (2013.01); *H04W 4/00* (2013.01);
(Continued)

(58) Field of Classification Search
CPC ..... H04W 4/00; H04W 88/06; H04W 72/048; H04W 4/10; H04W 72/04; H04W 84/12; H04W 76/45; H04M 1/7253
See application file for complete search history.

(56) References Cited

U.S. PATENT DOCUMENTS

2005/0164681 A1 * 7/2005 Jenkins ............... H04M 1/7255
455/412.1
2011/0047296 A1 * 2/2011 Ohkita ................... G09G 5/006
710/3
(Continued)

FOREIGN PATENT DOCUMENTS

JP  2013-222991 A  10/2013

*Primary Examiner* — Charles C Jiang
*Assistant Examiner* — Kyaw Z Soe
(74) *Attorney, Agent, or Firm* — Brundidge & Stanger, P.C.

(57) ABSTRACT

A mobile communication unit performs communication using a first communication scheme. A business wireless communication unit performs communication using a second communication scheme. A storage unit stores first information and second information, mapping the first information and the second information to each other, the first information being defined to receive, using the first communication scheme, service from a further communication terminal device capable of communication using the first communication scheme and the second communication scheme, and the second information being defied to perform communication with the further communication terminal device using the second communication scheme. A business wireless processing unit causes communication based on the second information stored in the storage unit to be performed preferentially, when the business wireless communication unit performs communication with the further communication terminal device while the mobile (Continued)

communication unit is receiving the service from the further communication terminal device.

3 Claims, 30 Drawing Sheets

(51) Int. Cl.
*H04M 1/725* (2006.01)
*H04W 72/04* (2009.01)
*H04W 76/45* (2018.01)
*H04W 84/12* (2009.01)
*H04W 88/06* (2009.01)

(52) U.S. Cl.
CPC ............ *H04W 4/10* (2013.01); *H04W 88/06* (2013.01); *H04W 76/45* (2018.02); *H04W 84/12* (2013.01)

(56) References Cited

U.S. PATENT DOCUMENTS

| 2011/0103377 A1* | 5/2011 | Hua | H04L 65/80 370/352 |
| 2014/0256256 A1* | 9/2014 | Park | H04W 36/14 455/41.1 |
| 2017/0245147 A1* | 8/2017 | Liu | H04W 12/06 |

* cited by examiner

FIG. 5

| MOBILE COMMUNICATION INFORMATION | | | BUSINESS WIRELESS INFORMATION | | | OTHER INFORMATION | | |
|---|---|---|---|---|---|---|---|---|
| IP ADDRESS | | | CHANNEL TYPE | USER ID | GROUP ID | TELEPHONE NUMBER | | |
| 192 | 168 | 100 | 2 | Analogue(0) | xxxxx | XXXXX | 1 | MMM | MMMM |

FIG. 6

| No | MOBILE COMMUNICATION INFORMATION | BUSINESS WIRELESS INFORMATION | | | OTHER INFORMATION |
|---|---|---|---|---|---|
| | IP ADDRESS | CHANNEL TYPE | USER ID | GROUP ID | TELEPHONE NUMBER |
| 1 | 192.168.100.2 | Analogue | xxxxx | XXXXX | +1(MMM)MMMM |
| 2 | 192.168.100.3 | Digital Conventional | yyyyy | YYYYY | +1(NNN)NNNN |
| 3 | 192.168.100.4 | Digital Trunking | zzzzz | ZZZZZ | +1(PPP)PPPP |
| : | : | : | : | : | : |

FIG. 8

| List No. | MOBILE COMMUNICATION INFORMATION | | | | BUSINESS WIRELESS INFORMATION | | | OTHER INFORMATION | | |
|---|---|---|---|---|---|---|---|---|---|---|
| | IP ADDRESS | | | | CHANNEL TYPE | USER ID | GROUP ID | TELEPHONE NUMBER | | |
| 1 | 192 | 168 | 100 | 2 | Analogue(0) | xxxxx | XXXXX | 1 | MMM | MMMM |
| 2 | 192 | 168 | 100 | 4 | Digital Trunking (2) | zzzzz | ZZZZZ | 1 | PPP | PPPP |
| : | : | : | : | : | : | : | : | : | : | : |

FIG. 10

| TRANSMISSION SOURCE INFORMATION ||||||| DESTINATION INFORMATION ||||
|---|---|---|---|---|---|---|---|---|---|
| USER ID | GROUP ID | IP ADDRESS |||| | | | |
| yyyyy | YYYYY | 192 | 168 | 100 | 3 | 192 | 168 | 100 | 2 |

FIG. 11

| TRANSMISSION SOURCE INFORMATION | | | | MOVING IMAGE FORMAT INFORMATION | | |
|---|---|---|---|---|---|---|
| IP ADDRESS | | | | COMMUNI-CATION SPEED | IMAGE SIZE | FORMAT |
| 192 | 168 | 100 | 1 | 1.5 Mbps | 640*480(VGA) | MPEG-1 | ns
COMMUNICATION TERMINAL DEVICE, COMMUNICATION SYSTEM, COMMUNICATION METHOD COMPATIBLE WITH AT LEAST TWO COMMUNICATION SCHEMES

CROSS-REFERENCE TO RELATED APPLICATION

This application is based upon and claims the benefit of priority from the prior Japanese Patent Application No. 2014-236657, filed on Nov. 21, 2014, and Japanese Patent Application No. 2014-236658, filed on Nov. 21, 2014, the entire contents of which are incorporated herein by reference.

FIELD

The present invention relates to communication technologies and, more particularly, to communication terminal devices, communication systems, and communication methods compatible with at least two communication schemes.

DESCRIPTION OF THE RELATED ART

Various methods for wireless network connection between electronic information devices are practiced. Examples of electronic information devices connected by a wireless network are projectors and PCs. The projector maintains first wireless configuration information, which is shared in the PC as second wireless configuration information. The PC maintains the second wireless configuration information, which is shared in the projector as the first wireless communication information. These items of wireless configuration information include a wireless communication mode, a wireless communication protocol, and an IP address and a frequency channel of a wireless terminal device connected. The projector and the PC establish wireless network connection based on an SSID and the wireless configuration information (see, for example, Patent Document 1).

[Patent Document 1] JP2013-222991

If one communication terminal device is compatible with two or more wireless schemes, connection is required for each of the wireless schemes. For example, if a communication terminal device is compatible with Internet Protocol (IP) communication (hereinafter, referred to as "mobile communication") such as Long Term Evolution (LTD) and Wireless Fidelity (WiFi) (registered trademark) and with business wireless communication, the user controls mobile communication and business wireless communication separately. To describe it more specifically, the function of transmitting and receiving a stream of moving images using mobile communication and the function of transmitting and receiving voice using business wireless communication are independent of each other. Therefore, the user should select a channel for business wireless communication to talk with another person transmitting a stream of moving images. In other words, the user needs to recognize the destination of connection in mobile communication and the destination of communication in business wireless communication separately and select a destination before initiating voice communication. Accordingly, complicated user operation is required.

SUMMARY

To address the aforementioned issue, a communication terminal device according to an embodiment comprises: a first communication unit that performs communication using a first communication scheme; and a second communication unit that performs communication using a second communication scheme different from the first communication scheme. The communication terminal device further comprises: a storage unit that stores first information and second information, mapping the first information and the second information to each other, the first information being defined to allow a further communication terminal device capable of communication using the first communication scheme and the second communication scheme to provide service using the first communication scheme, the second information being defined to perform communication with the further communication terminal device using the second communication scheme; and a processing unit that causes communication based on the second information stored in the storage unit to be performed preferentially, when the second communication unit performs communication with the further communication terminal device while the first communication unit is receiving the service from the further communication terminal device.

Another embodiment also relates to a communication terminal device. The device comprises: a first communication unit that performs communication using a first communication scheme; and a second communication unit that performs communication using a second communication scheme different from the first communication scheme. The device further comprises: a storage unit that stores first information on a further communication terminal device capable of communication using the first communication scheme and the second communication scheme and second information, mapping the first information and the second information to each other, the first information being defined to provide service to the further communication terminal device using the first communication scheme, and the second information being defined to perform communication with the further communication terminal device using the second communication scheme; and a processing unit that causes communication based on the second information stored in the storage unit to be performed preferentially, when the second communication performs communication with the further communication terminal device while the first communication unit is providing the service to the further communication terminal device.

Still another embodiment relates to a communication system. The communication system comprises: a first communication terminal device capable of performing communication using a first communication scheme and a second communication scheme that are mutually different; and a second communication terminal device capable of performing communication using the first communication scheme and the second communication scheme. The first communication terminal device provides service by broadcast using the first communication scheme, the second communication terminal device receiving the service communicates information for performing communication with the first communication terminal device using the second communication scheme to the first communication terminal device using the first communication scheme, and the first communication terminal device preferentially performs communication based on the communicated information when communicating with the second communication terminal device using the second communication scheme.

Still another embodiment relates to a communication method. The method is adapted to a system storing first information and second information in a memory, mapping the first information and the second information to each other, the first information being defined to allow a further communication terminal device capable of communication using a first communication scheme and a second communication scheme different from the first communication scheme to provide service using the first communication scheme, the second information being defined to perform communication with the further communication terminal device using the second communication scheme, and comprises: receiving the service from the further communication terminal device using the first communication scheme; and causing communication based on the second information stored in the memory to be performed preferentially, when communication with the further communication terminal device is performed using the second communication scheme.

Still another embodiment relates to a communication method. The method is adapted to a system storing first information on a further communication terminal device capable of communication using a first communication scheme and a second communication scheme and second information in a memory, mapping the first information and the second information to each other, the first information being defined to provide service to the further communication terminal device using the first communication scheme, the second information being defined to perform communication with the further communication terminal device using the second communication scheme, and comprises: providing the service to the further communication terminal device using the first communication scheme; and causing communication based on the second information stored in the memory to be performed preferentially, when communication with the further communication terminal device is performed using the second communication scheme.

Still another embodiment relates to a communication method. The method comprises: providing, using a first communication terminal device capable of performing communication using a first communication scheme and a second communication scheme that are mutually different, service by broadcast using the first communication scheme; when a second communication terminal device capable of performing communication using the first communication scheme and the second communication scheme receives the service, communicating information for performing communication with the first communication terminal device using the second communication scheme to the first communication terminal device using the first communication scheme, and when the first communication terminal device communicates with the second communication terminal device using the second communication scheme, preferentially performing communication based on the communicated information.

Still another embodiment relates to a communication system. The system comprises: a first communication terminal device capable of performing communication using a first communication scheme and a second communication scheme that are mutually different; a second communication terminal device capable of performing communication using the first communication scheme and the second communication scheme; and a server device capable of performing communication with the first communication terminal device and the second communication terminal device. The second communication terminal device communicates, to the server device, link information that maps first information for providing service using the first communication scheme and second information for performing communication using the second communication scheme to each other, the first communication terminal device requests the server device to transmit the link information using the first communication scheme and receives the link information from the server device using the first communication scheme, and the first communication terminal device performs communication based on the second information included in the link information preferentially, when the first communication terminal device performs communication with the second communication terminal device using the second communication scheme while receiving the service using the first communication scheme.

Still another embodiment relates to a communication system. The communication system comprises: a first communication terminal device capable of performing communication using a first communication scheme and a second communication scheme that are mutually different; a second communication terminal device capable of performing communication using the first communication scheme and the second communication scheme; and a server device capable of performing communication with the first communication terminal device and the second communication terminal device. The second communication terminal device communicates, to the server device, link information that maps first information for receiving service using the first communication scheme and second information for performing communication using the second communication scheme to each other, using the first communication scheme, the first communication terminal device requests the server device to transmit the link information using the first communication scheme and receives the link information from the server device using the first communication scheme, and the first communication terminal device performs communication based on the second information included in the link information preferentially, when the first communication terminal device performs communication with the second communication terminal device using the second communication scheme while providing the service.

Still another embodiment relates to a communication system. The communication system comprises: a first communication terminal device capable of performing communication using a first communication scheme and a second communication scheme that are mutually different; a second communication terminal device capable of performing communication using the first communication scheme and the second communication scheme; and a server device capable of performing communication with the first communication terminal device and the second communication terminal device. The second communication terminal device communicates, to the server device, link information that maps first information for receiving service using the first communication scheme and second information for performing communication using the second communication scheme to each other, using the first communication scheme, the first communication terminal device requests the server device to transmit the link information using the first communication scheme and receives the link information from the server device using the first communication scheme, and the first communication terminal device provides service by broadcast using the first communication scheme, and performs communication based on the second information included in the link information preferentially, when the first communication terminal device performs communication with the second communication terminal device using the second communication scheme upon being notified using the first communication scheme that the second communication terminal device is receiving the service.

Optional combinations of the aforementioned constituting elements, and implementations of the embodiments in the form of methods, apparatuses, systems, recording mediums, and computer programs may also be practiced as additional modes of the embodiments.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 5 shows the data structure of the link information transmitted from the second communication terminal device of FIG. 3;

FIG. 6 shows the data structure of the database stored in the server device of FIG. 4;

FIG. 8 shows the data structure of the link information output from the server device of FIG. 4;

FIG. 10 shows the data structure of a moving image request output from the first communication terminal device of FIG. 2;

FIG. 11 shows the data structure of the moving image request output from the server device of FIG. 4;

DETAILED DESCRIPTION

The invention will now be described by reference to the preferred embodiments. This does not intend to limit the scope of the present invention, but to exemplify the invention.

Embodiment 1

A brief summary will be given before describing the invention in specific details. Embodiment 1 relates to a communication system including two wireless communication schemes. For example, it relates to a communication system including mobile communication and business wireless communication. As mentioned above, mobile communication is exemplified by IP communication such as LTD, WiFi, etc. Other than these, mobile communication may include wireless Metropolitan Area Network (MAN) such as Worldwide Interoperability for Microwave Access (Wi-MAX). Wireless MAN uses the Transmission Control Protocol (TCP)/IP or layers above or below for communication. In mobile communication, voice communication is also enabled. However, the following description concerns data communication, and, in particular, streaming of moving images. Meanwhile, business wireless communication allows voice communication in a predefined wireless CH. Voice communication is exemplified by Push to Talk (PTT). In PTT, the user pushes a button during a conversation and releases the button when the conversation is terminated. In business wireless communication, it is also possible to form a group by a plurality of communication terminal devices. A base station device in business wireless communication assigns an upstream channel and a downstream channel to a group. Once the group and the channels are set up, one communication terminal device in the group transmits a signal using the upstream channel and another communication terminal device in the group receives the signal using the downstream channel.

While a communication terminal device according to the embodiment is receiving moving images from another communication terminal device using mobile communication, the receiving communication terminal device performs voice communication using business wireless communication with the other communication terminal device transmitting the moving images. In order to prohibit the user operation from becoming too complicated, the receiving communication terminal device accesses a server device using mobile communication before receiving the moving images and acquires link information from the server device. The link information associates the IP address referred to by the other communication terminal device to deliver a stream of moving images with the wireless CH information referred to by the other communication terminal device to use business wireless communication. The receiving communication terminal device acquires the wireless CH from the link information and performs voice communication using business wireless communication.

Figure 1:
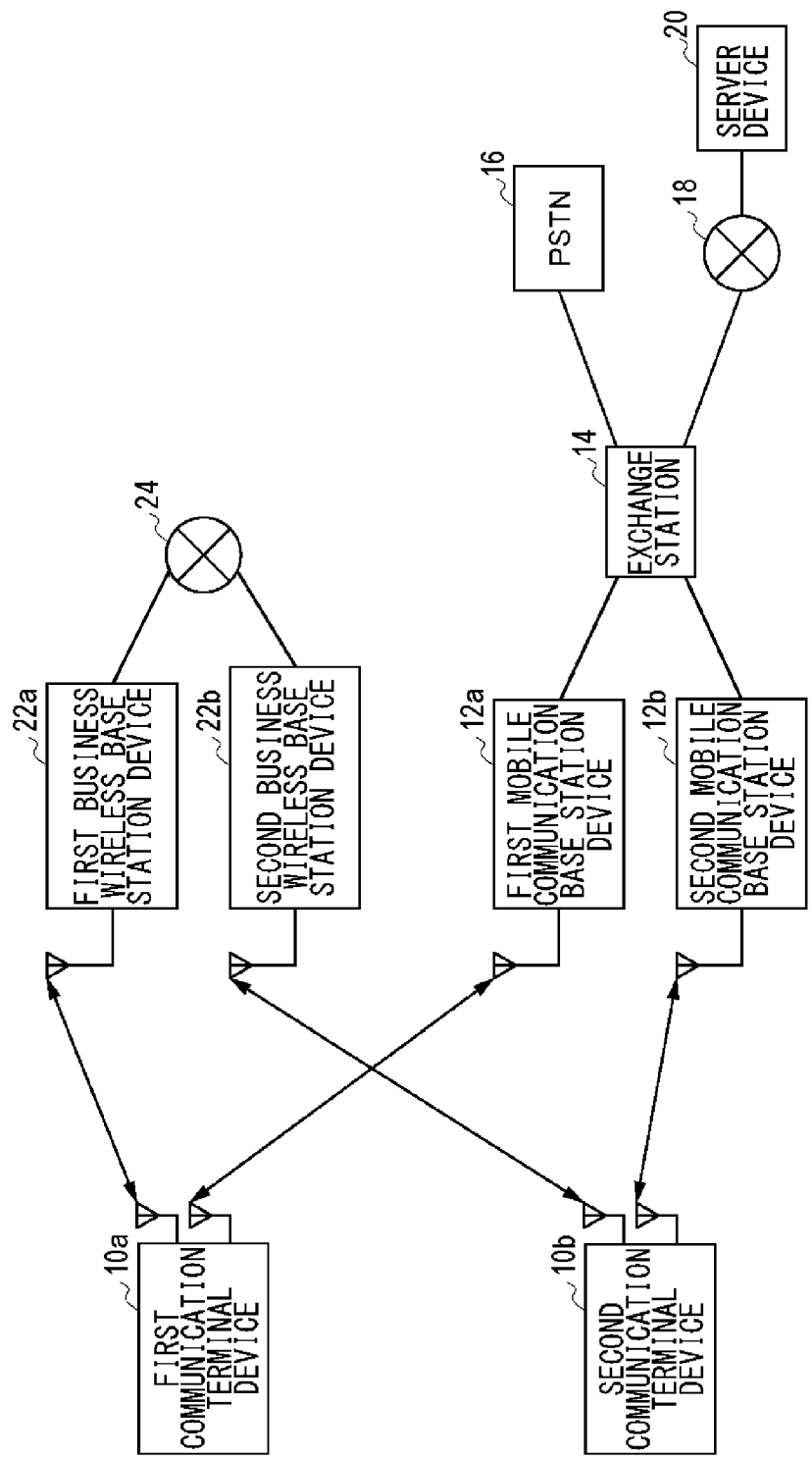
FIG. 1 shows the features of a communication system according to Embodiment 1.

FIG. 1 shows the features of a communication system 100 according to Embodiment 1. The communication system 100 includes a first communication terminal device 10a, a second communication terminal device 10b, which are generically referred to as communication terminal devices 10, a first mobile communication base station device 12a, a second mobile communication base station device 12b, which are generically referred to as mobile communication base station devices 12, an exchange station 14, a Public Switched Telephone Network (PSTN) 16, Internet 18, a server device 20, a first business wireless base station device 22a, a second business wireless base station device 22b, which are generically referred to as business wireless base station devices 22.

The communication terminal device 10 is capable of communicating using mobile communication and business wireless communication. A publicly known technology may be used for mobile communication and business wireless communication so that a description thereof is omitted. One of the first communication terminal device 10a and the second communication terminal device 10b performs the server function of streaming moving images and the other performs the client function of receiving and reconstructing the moving images delivered by streaming. The first communication terminal device 10a and the second communication terminal device 10b are provided with the server function and the client function but perform one of the functions depending on the situation. Further, the first communication terminal device 10a is described here as originating voice communication in business wireless communication and the second communication terminal device 10b is described as receiving voice communication in business wireless communication for the sake of brevity. The relationship may be inverted.

The mobile communication base station devices 12 are base station devices compatible with mobile communication systems. Each of the mobile communication base station devices 12 is connected at one end with the communication terminal device 10 and at the other end with the exchange station 14. The first mobile communication base station device 12a and the second mobile communication base station device 12b are provided at different locations. The exchange station 14 controls mobile communication. The exchange station 14 is also connected to the PSTN 16 and the Internet 18. Under the control of the exchange station 14, the first communication terminal device 10a and the second communication terminal device 10b are capable of communicating with each other via the first mobile communication base station device 12a, the exchange station 14, and the second mobile communication base station device 12b. The communication terminal devices 10 are also capable of communicating with the PSTN 16 and the Internet 18 via the mobile communication base station devices 12 and the exchange station 14.

The PSTN 16 is a telephone subscriber line network and performs voice communication using a circuit switched system. The Internet 18 primarily performs data communication using IP communication. The server device 20 is connected to the Internet 18 and communicates with the communication terminal devices 10 via the Internet 18, the exchange station 14, and the mobile communication base station devices 12. The server device 20 stores and manages the link information described later. The communication terminal devices 10 access the server device 20 via the mobile communication base station devices 12, the exchange station 14, and the Internet 18 so as to register link information in the server device 20 or acquire link information from the server device 20. According to this configuration, the first communication terminal device 10a and the second communication terminal device 10b are capable of exchanging the link information.

The business wireless base station device 22 are base station devices compatible with business wireless systems. Each of the business wireless base station devices 22 is connected at one end with the communication terminal device 10 using business wireless communication and at the other end with a network 24. The first business wireless base station device 22a and the second business wireless base station device 22b are provided at different locations. The network 24 connects the first business wireless base station device 22a and the second business wireless base station device 22b. Through this connection, the first communication terminal device 10a and the second communication terminal device 10b are capable of communicating with each other via the first business wireless base station device 22a, the network 24, and the second business wireless base station device 22b. Both the first communication terminal device 10a and the second communication terminal device 10b may be connected to the first business wireless base station device 22a and capable of communicating with each other.

Figure 2:
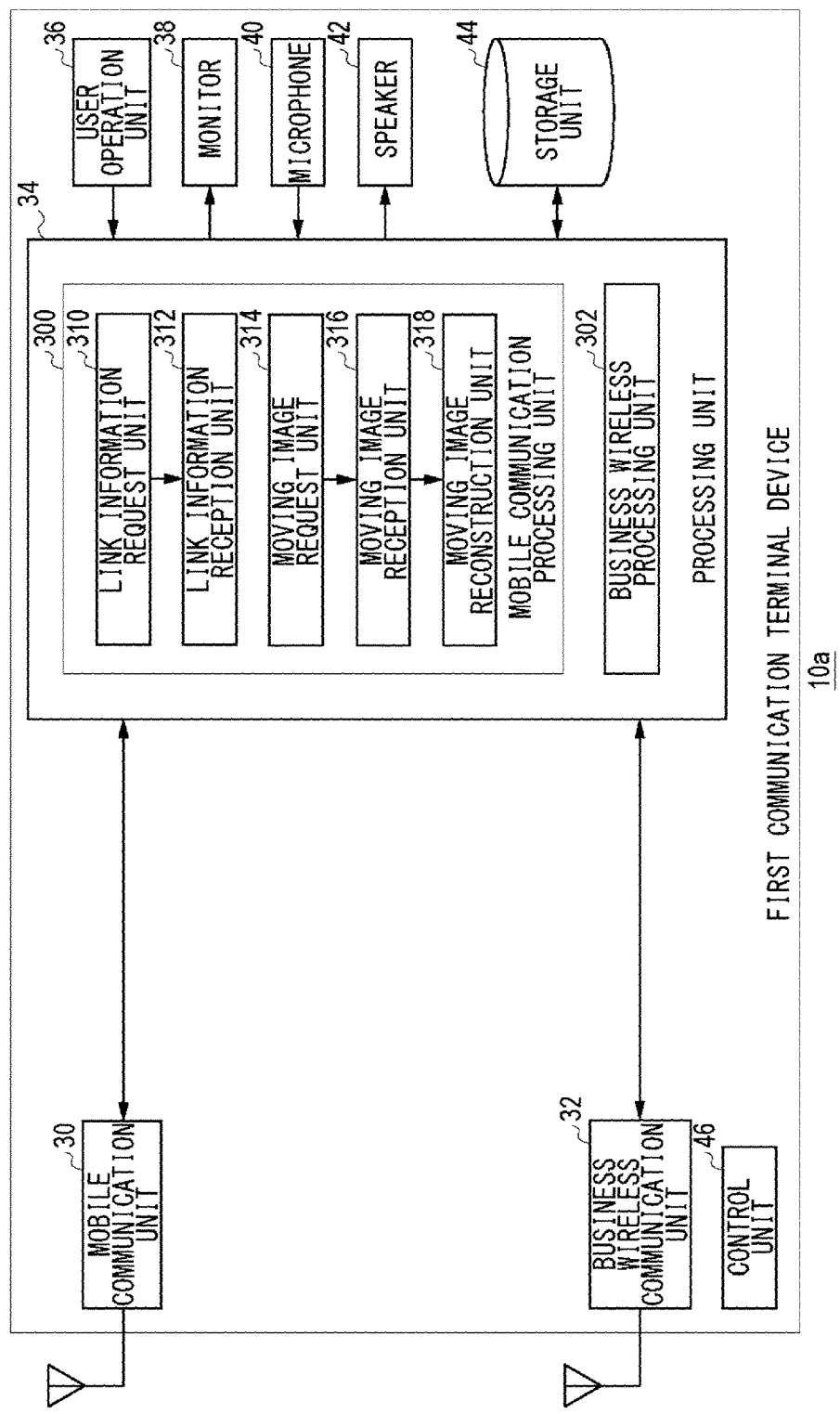
FIG. 2 shows the features of the first communication terminal device of FIG. 1.

FIG. 2 shows the features of the first communication terminal device 10a. The first communication terminal device 10a includes a mobile communication unit 30, a business wireless communication unit 32, a processing unit 34, a user operation unit 36, a monitor 38, a microphone 40, a speaker 42, a storage unit 44, and a control unit 46. The processing unit 34 includes a mobile communication processing unit 300 and a business wireless processing unit 302. The mobile communication processing unit 300 includes a link information request unit 310, a link information reception unit 312, a moving image request unit 314, a moving image reception unit 316, and a moving image reconstruction unit 318. The first communication terminal device 10a runs the client function in the streaming of moving images and originates a call in business wireless communication.

The mobile communication unit 30 performs mobile communication with the mobile communication base station device 12. The mobile communication unit 30 communicates with the other communication terminal device 10, the PSTN 16, the Internet 18, and the server device 20 via the mobile communication base station devices 12, and the exchange station 14. The mobile communication unit 30 in the communication terminal device 10 is identified by, for example, an IP address. The IP address is for providing service using mobile communication or for receiving service using mobile communication. Hereinafter, the IP address will be referred to as "first information." The service in this embodiment is exemplified by delivery of moving images. Therefore, the first information may be information on the destination referred to for delivery of moving images using mobile communication or information on the source of delivery referred to for reception of moving images using mobile communication.

The business wireless communication unit 32 performs communication with the business wireless base station device 22 using business wireless communication. The business wireless communication unit 32 also performs voice communication with the other business wireless communication unit 32 via the business wireless base station device 22. The business wireless communication unit 32 in the communication terminal device 10 is identified by a wireless CH. The wireless CH is identified by information on a channel type in the business wireless communication scheme and identification information such as a user ID, a group ID, etc. Hereinafter, these items of information will be referred to as "second information." Therefore, the second information is information for performing business wireless communication.

The processing unit 34 controls communication by the mobile communication unit 30 and the business wireless communication unit 32. Further, the processing unit 34 delivers moving images or reconstructs delivered moving images. The processing unit 34 performs processes in coordination with the second communication terminal device 10b and the server device 20 described later and so will be described later along with those processes.

The user operation unit 36 is formed by a button, a touch panel, etc. and receives an input from the user. The user operation unit 36 outputs the received input to the processing unit 34. The monitor 38 receives and displays images, moving images, and messages from the processing unit 34. If the screen is a touch panel, the monitor 38 is integrated with the user operation unit 36. The microphone 40 receives voice from the user at the time of a call and converts the voice into a voice signal. The microphone 40 outputs the voice signal to the processing unit 34. The speaker 42 receives the voice signal from the processing unit 34 at the time of a call and outputs the voice signal as voice. The speaker 42 may output an alert sound, etc. The storage unit 44 stores the link information of the communication terminal device 10, the link information of the other communication terminal device 10, moving image data, etc. Writing in the storage unit 44 and reading from the storage unit 44 are performed by the processing unit 34. The control unit 46 controls the operation of the first communication terminal device 10a.

The features are implemented in hardware such as a CPU, a memory, or other LSI's of an arbitrary computer, and in software such as a program loaded into a memory, etc. The figure depicts functional blocks implemented by the cooperation of these elements. Therefore, it will be obvious to those skilled in the art that the functional blocks may be implemented in a variety of manners by hardware only, by software only, or by a combination of hardware and software.

Figure 3:
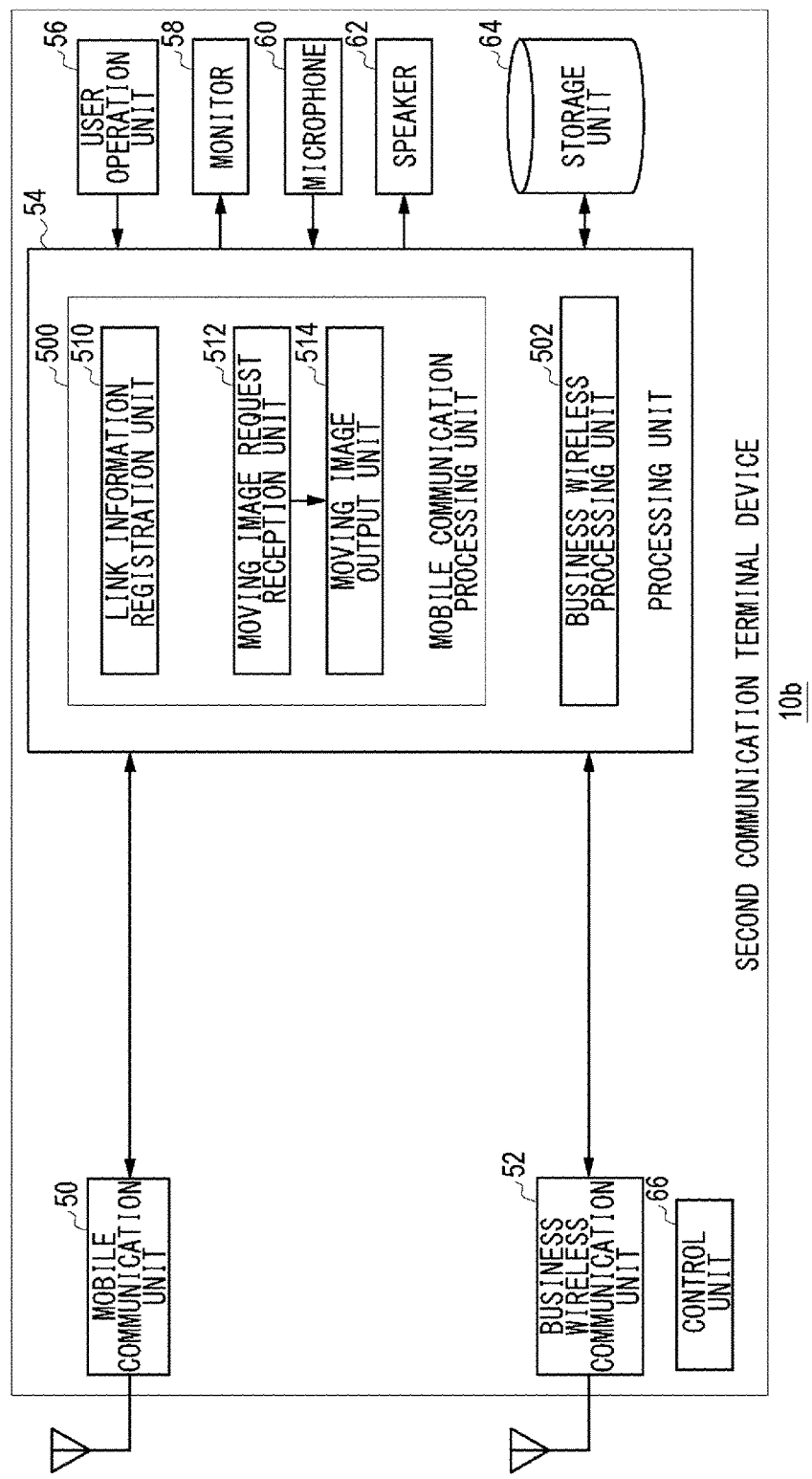
FIG. 3 shows the features of the second communication terminal device of FIG. 1.

FIG. 3 shows the features of the second communication terminal device 10b. The second communication terminal device 10b includes a mobile communication unit 50, a business wireless communication unit 52, a processing unit 54, a user operation unit 56, a monitor 58, a microphone 60, a speaker 62, a storage unit 64, and a control unit 66. The processing unit 54 includes a mobile communication processing unit 500 and a business wireless processing unit 502. The mobile communication processing unit 500 includes a link information registration unit 510, a moving image request reception unit 512, and a moving image output unit 514. The second communication terminal device 10b runs the server function in the streaming of moving images and receives a call in business wireless communication.

The mobile communication unit 50 through the control unit 66 are the same as the mobile communication unit 30 through the control unit 46 of FIG. 2 so that a description thereof is omitted. Like the processing unit 34 described above, the processing unit 54 performs processes in coordination with the first communication terminal device 10a and the server device 20 and so will be described later along with those processes.

Figure 4:
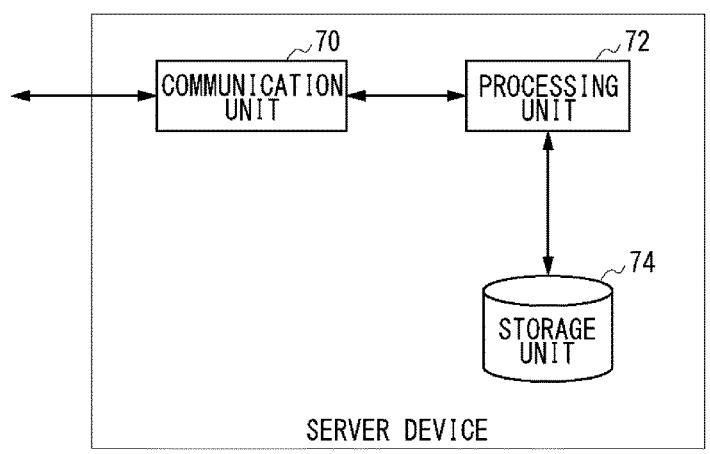
FIG. 4 shows the features of the server device of FIG. 1.

FIG. 4 shows the features of the server device 20. The server device 20 includes a communication unit 70, a processing unit 72, and a storage unit 74. The communication unit 70 is connected to the Internet 18 and communicates with the communication terminal device 10 via the Internet 18, the exchange station 14, and the mobile communication base station device 12. The processing unit 72 receives link information from the communication terminal device 10 or outputs link information to the communication terminal device 10 via the communication unit 70. The link information is a combination of the first information and the second information for a single communication terminal device 10 and represents information to associating mobile communication with business wireless communication for a single communication terminal device 10. An aggregate of a plurality of items of link information will also be referred to as link information. The storage unit 74 stores the link information.

A description will be given of processes in the processing unit 34 in the first communication terminal device 10a, the processing unit 54 in the second communication terminal device 10b, and the processing unit 72 in the server device 20. The mobile communication unit 50 of the second communication terminal device 10b receives an instruction and connects to the mobile communication base station device 12. The link information registration unit 510 of the second communication terminal device 10b transmits the link information of the second communication terminal device 10b to the server device 20 using mobile communication, thereby registering the link information in the server device 20. As described above, the link information includes the first information, i.e., the IP address for providing service using mobile communication and the second information such as the identification information for performing business wireless communication.

FIG. 5 shows the data structure of the link information transmitted from the second communication terminal device 10b. As shown in the figure, the link information includes mobile communication information, business wireless communication information, and other information. The mobile communication information corresponds to the first information and is an IP address. The business wireless communication information corresponds to the second information and includes a channel type, a user ID, and a group ID. The channel type is information for identifying one of a plurality of protocols defined in business wireless communication information. The user ID is identification information for identifying the second communication terminal device 10b, and the group ID is identification information for identifying the group in which the second communication terminal device 10b is included. The combination of these items of information identifies a wireless CH. The other information is information used to perform communication other than mobile communication and business wireless communication. The frequency information or the like necessary for business wireless voice communication is defined in both terminals and these items of information are linked by the user ID and the group ID.

The processing unit 72 of the server device 20 receives the link information from the second communication terminal device 10b and causes the link information to be stored in the storage unit 74. FIG. 6 shows the data structure of the database stored in the server device 20. As shown in the figure, the database includes mobile communication information, business wireless communication information, and other information of each communication terminal device 10. These items of information are as shown in FIG. 5. The information is updated each time the situation of network connection from the communication terminal device 10 to the server device 20 changes. In the event of an update on the processing unit 72, the old information is extracted by using the user ID as a key and is replaced by new information.

Figure 7:
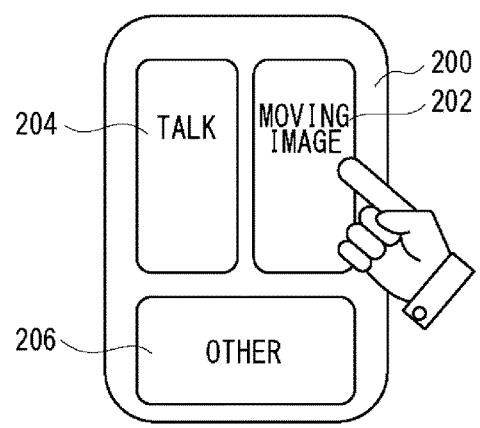
FIG. 7 shows a screen displayed in the first communication terminal device of FIG. 2.

The monitor 38 of the first communication terminal device 10a displays a screen for prompting the user to enter an instruction. FIG. 7 shows a screen displayed in the first communication terminal device 10a. A main menu 200 includes a moving image button 202, a talk button 204, and a further button 206. When the user selects the moving image button 202, the link information request unit 310 of the first communication terminal device 10a requests the server device 20 to transmit link information using mobile communication. This causes a link information request to be transmitted to the server device 20.

When the processing unit 72 of the server device 20 receives the link information request from the first communication terminal device 10a, the processing unit 72 acquires the link information from the storage unit 74 and transmits the link information to the first communication terminal device 10a. FIG. 8 shows the data structure of the link information output from the server device 20. The link information transmitted is as shown in FIG. 7.

Figure 9:
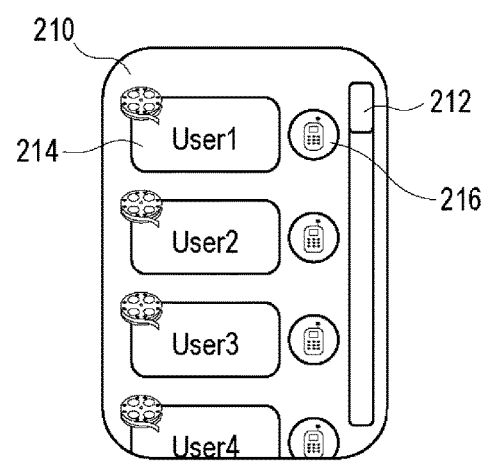
FIG. 9 shows a screen displayed in the first communication terminal device of FIG. 2.

The link information reception unit 312 of the first communication terminal device 10a receives the link information from the server device 20 using mobile communication. Receiving the link information, the link information reception unit 312 stores the link information in the storage unit 44. The link information reception unit 312 also generates a moving image selection screen based on the link information and displays the screen on the monitor 38. FIG. 9 shows a screen displayed in the first communication terminal device 10a. The moving image selection screen 210 includes a slide bar 212, a moving image selection button 214, a wireless CH switch button 216. When the user selects the moving image selection button 214, reception of a stream of moving images using mobile communication is started. When the user selects the wireless CH switch button 216, the wireless CH is switched to the channel linked to the moving images. This user operation only switches the wireless CH for business wireless communication and does not transmit voice by PTT.

When the user selects an arbitrary moving image selection button 214 in the moving image selection screen, the moving image request unit 314 of the first communication terminal device 10a transmits a request for the selected moving images to the server device 20 using mobile communication. FIG. 10 shows the data structure of a moving image request output from the first communication terminal device 10a. The moving image request includes transmission source information and transmission destination information. The transmission source information is information related to the source of transmission of the moving image request and corresponds to a portion of the link information of the first communication terminal device 10a. The destination information indicates the ultimate destination of the moving image request and is the IP address of the second communication terminal device 10b. In the above steps, the moving image selection screen 210 is generated based on the link information stored in the storage unit 44 before a moving image request is transmitted. In other words, the moving image request is transmitted based on the link information stored in the storage unit 44. However, the moving image request may not be transmitted based on the link information stored in the storage unit 44. For example, the user of the first communication terminal device 10a knowing the IP address of the second communication terminal device 10b may directly enter the IP address to transmit the moving image request. Alternatively, the moving image request may be transmitted based on information other than the first information.

The processing unit 72 of the server device 20 receives the moving image request from the first communication terminal device 10a and transmits the moving image request to the second communication terminal device 10b in accordance with the received moving image request. The processing unit 72 determines whether to permit the delivery of moving images based on the transmission source information included in the received moving image request and transmits the moving image request to the second communication terminal device 10b only if the moving images have not been delivered yet from the destination of the moving image request. FIG. 11 shows the data structure of the moving image request output from the server device 20. The IP address of the root of the server device 20 is designated as the transmission destination information. Information predefined in the configuration in the server device 20 is designated in the moving image format information. The reason that the IP address of the root of the server device 20 is designated as the destination of transmission of the moving images is to prohibit the second communication terminal device 10b from performing complicated processes for delivery of moving images.

The moving image request reception unit 512 of the second communication terminal device 10b receives the moving image request from the server device 20. The moving image output unit 514 of the second communication terminal device 10b transmits the moving image data stored in the storage unit 64 to the server device 20 in response to the moving image request. The processing unit 72 of the server device 20 receives the moving image data from the second communication terminal device 10b. The processing unit 72 transmits the moving image data to the first communication terminal device 10a in accordance with the request for delivery of moving images and the determination as to whether to permit the delivery. The processing unit 72 temporarily buffers the moving image data transmitted from the second communication terminal device 10b in the storage unit 74 and, if the moving image request is received and if it is determined that the delivery of moving images should be permitted, delivers the moving images as necessary to the communication terminal device 10 originating the request for the moving images. Thus, the moving image data is delivered via the server device 20.

The moving image reception unit 316 of the first communication terminal device 10a receives the moving image data from the server device 20 using mobile communication. The moving image reception unit 316 outputs the received moving image data to the moving image reconstruction unit 318. The moving image reconstruction unit 318 of the first communication terminal device 10a reconstructs the moving image data from the moving image reception unit 316 and displays the reconstructed moving image data on the monitor 38.

Thus, the first communication terminal device 10a receives the delivery of moving image data based on the first information included in the link information. When a destination of voice transmission is selected and PTT is initiated by a user operation in this situation in order to transmit voice to the source of delivery of moving images being viewed, the business wireless processing unit 302 performs voice transmission. To describe it in further details, the business wireless processing unit 302 communicates with the second communication terminal device 10b using business wireless communication such that communication based on the second information included in the link information is performed preferentially. Communication based on the second information included in the link information represents communication using the wireless CH identified based on the second information. In accordance with this procedure, the business wireless processing unit 502 of the second communication terminal device 10b performs communication using business wireless communication.

Figure 12:
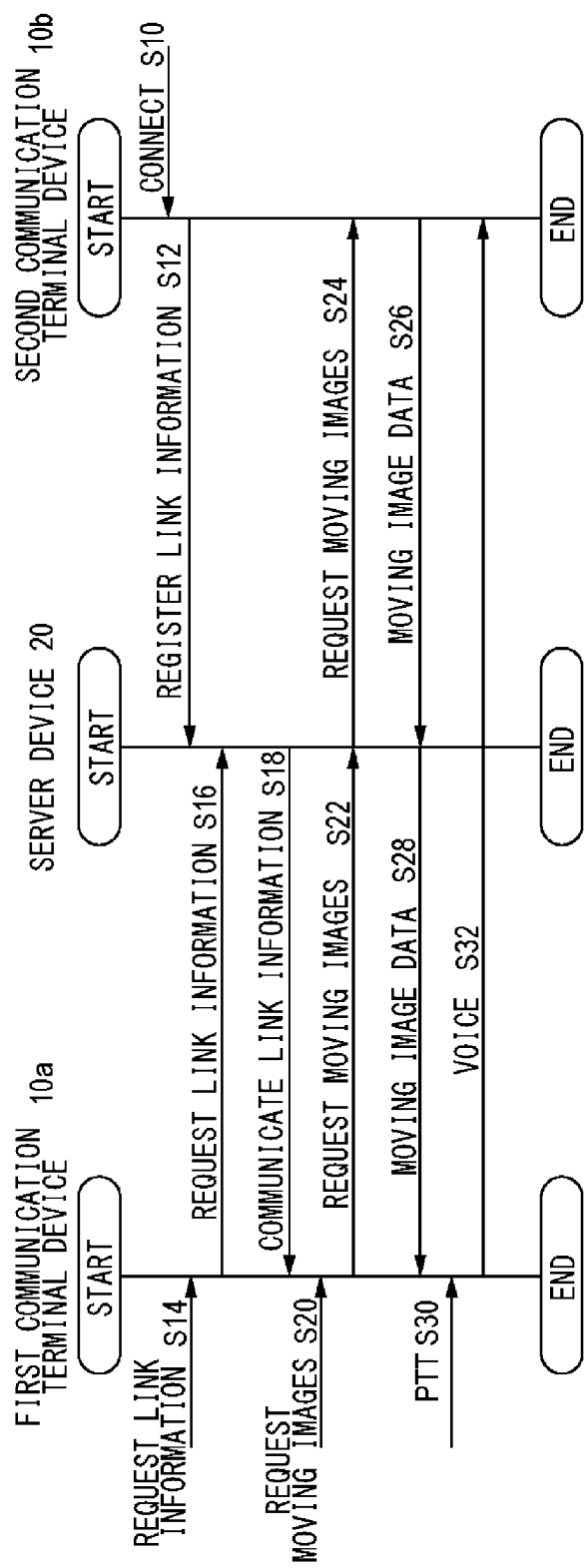
FIG. 12 is a sequence diagram showing the steps of communication in the communication system of FIG. 1.

A description will be given of the operation of the communication system 100 with the above features. FIG. 12 is a sequence diagram showing the steps of communication in the communication system 100. The second communication terminal device 10b performs connection using mobile communication (S10). The second communication terminal device 10b registers the link information in the server device 20 (S12). A link information request is entered in the first communication terminal device 10a (S14). The first communication terminal device 10a transmits the link information request to the server device 20 (S16). The server device 20 communicates the link information to the first communication terminal device 10a (S18). A moving image request is entered in the first communication terminal device 10a (S20). The first communication terminal device 10a transmits the moving image request to the server device 20 (S22) and the server device 20 transmits the moving image request to the second communication terminal device 10b (S24). The second communication terminal device 10b transmits the moving image data to the server device 20 (S26) and the server device 20 transmits the moving image data to the first communication terminal device 10a (S28). The button in the user operation unit 36 in the first communication terminal device 10a is pressed for PTT (S30). The first communication terminal device 10a transmits voice to the second communication terminal device 10b (S32).

Figure 13:
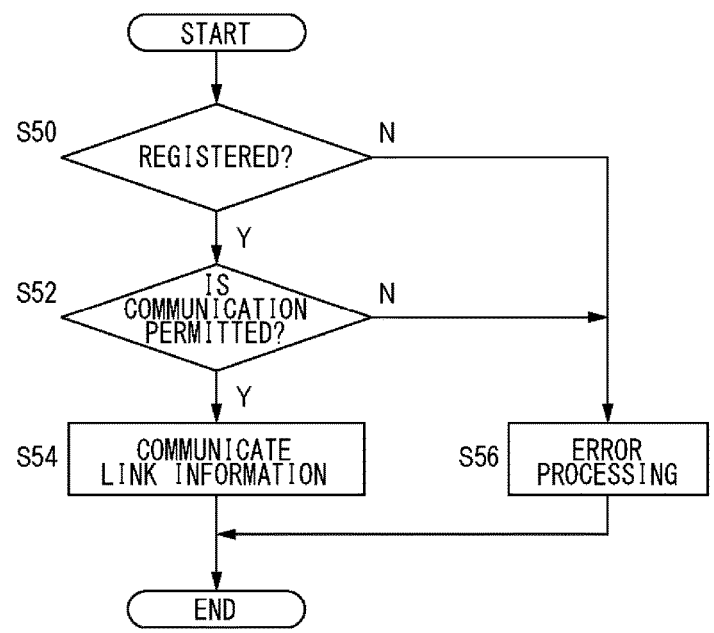
FIG. 13 is a flowchart showing the steps of receiving the link information by the server device of FIG. 4.

FIG. 13 is a flowchart showing the steps of receiving the link information by the server device 20. If the link information is already registered (Y in S50) and communication is permitted (Y in S52), the processing unit 72 communicates the link information (S54). Meanwhile, if the link information has not been registered yet (N in S50) or communication is not permitted (N in S52), the processing unit 72 performs an error process (S56).

Figure 14:
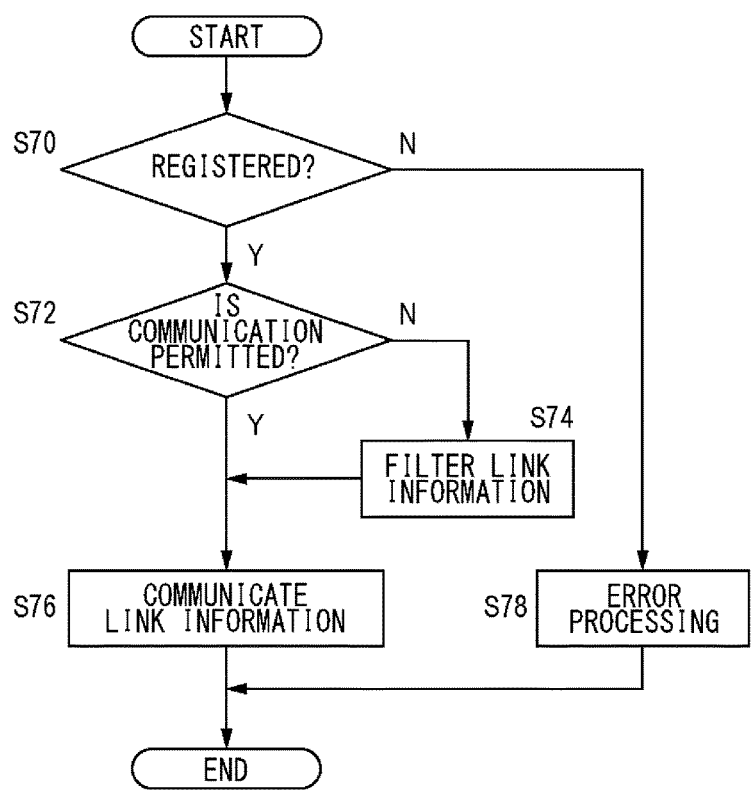
FIG. 14 is a flowchart showing alternative steps of receiving the link information request by the server device of FIG. 4.

FIG. 14 is a flowchart showing alternative steps of receiving the link information request by the server device 20. If the link information is already registered (Y in S70) and communication is permitted (Y in S72), the processing unit 72 communicates the link information (S76). Meanwhile, if communication is not permitted (N in S72), the processing unit 72 filters the link information (S74) and communicates the link information (S76). If the link information has not been registered (N in S70), the processing unit 72 performs an error process (S78).

Figure 15:
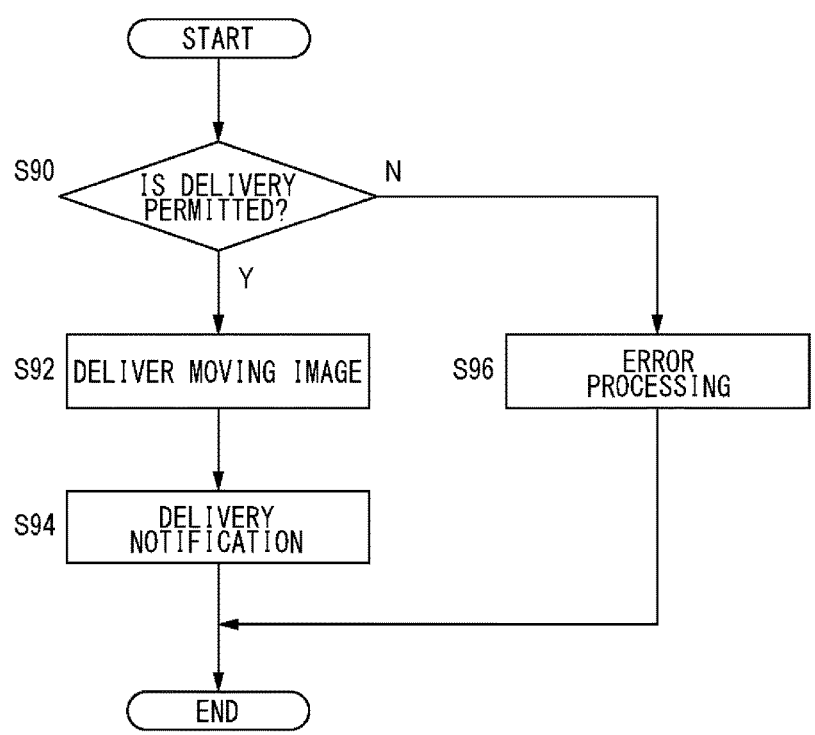
FIG. 15 is a flowchart showing the steps of delivering moving image data by the server device of FIG. 4.

FIG. 15 is a flowchart showing the steps of delivering moving image data by the server device 20. If the delivery is permitted (Y in S90), the processing unit 72 delivers the moving image data to the first communication terminal device 10a (S92) and transmits a notification of delivery to the second communication terminal device 10b (S94). Meanwhile, if the delivery is not permitted (N in S90), the processing unit 72 performs an error process (S96). Transmission of a notification of delivery may be omitted.

According to the embodiment, the link information on the second communication terminal device is received. Therefore, in originating a call to the second communication terminal device using business wireless communication while the moving image data is being received using mobile communication from the second communication terminal device, the wireless CH of the second communication terminal device can be identified based on the second information in the link information. Since the link information is received in advance, the wireless CH of the second communication terminal device can be automatically identified. Since the wireless CH of the second communication terminal device is automatically identified while the moving image data is being received using mobile communication, the user operation is prevented from becoming too complicated in a device compatible with a plurality of communication schemes. Since the link information is managed in the server device, the process in the communication terminal device is simplified.

Since the moving image data is delivered via the server device, a determination can be made as to whether the delivery is permitted. Since a determination as to whether the delivery is permitted is made in the server device, the requirement for a determination on permission in the communication terminal device is eliminated. Further, since the server device makes a determination on permission, the safety of delivery is ensured. Since the moving image data is temporarily stored in the server device before being delivered, the communication terminal device is capable of eliminating the need for delivering the moving image data additionally when the delivery of the same moving image data to a plurality of communication terminal devices is required. Further, the channel is controlled by using the information linking the destination of connection in mobile communication and the wireless CH for business wireless communication so that the load imposed on the user for user control is lessened.

Embodiment 2

A description will now be given of Embodiment 2. Like Embodiment 1, Embodiment 2 also relates to a communication system including two wireless communication schemes. The communication terminal device according to Embodiment 1 receiving moving images using mobile communication performs voice communication using business wireless communication with the other communication terminal device originating the moving images. Meanwhile, the relationship between the communication terminal devices according to Embodiment 2 is inverted as compared to Embodiment 1 in respect of the source and destination of delivery of moving images. In other words, the communication terminal device transmitting moving images using mobile communication performs voice communication using business wireless communication with the other communication terminal device that is the destination of moving images. In order to prevent the user operation from becoming too complicated, the communication terminal device receiving a moving image request from the other communication terminal device using mobile communication accesses the server device to acquire the link information from the server device. The communication terminal device acquires the wireless CH from the link information and performs voice communication using business wireless communication. The communication system and the server device according to Embodiment 2 are of the same type as those of FIGS. 1 and 4. The following description concerns a difference from the embodiment described above.

Figure 16:
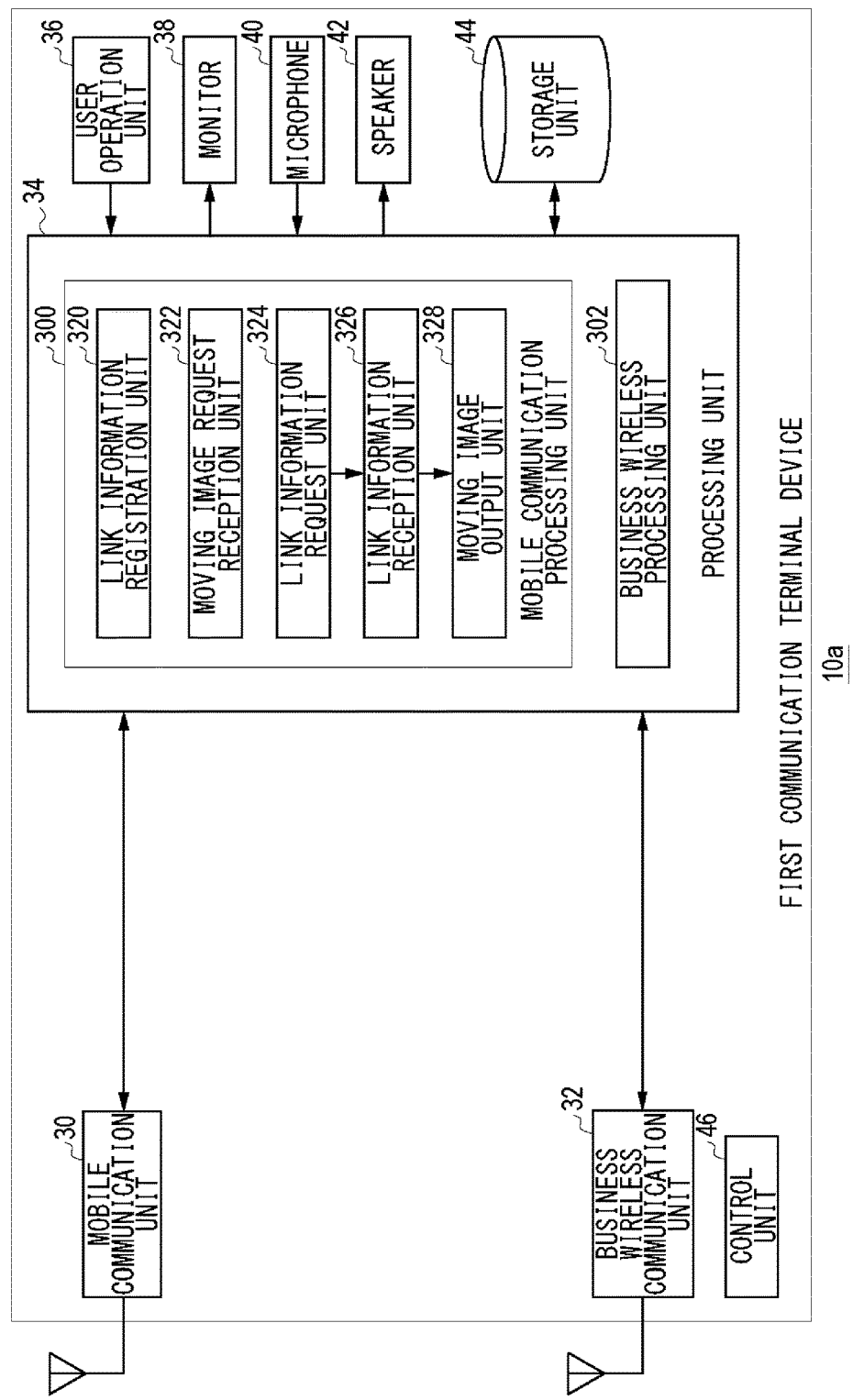
FIG. 16 shows the features of the first communication terminal device according to Embodiment 2.

FIG. 16 shows the features of the first communication terminal device 10a according to Embodiment 2. The mobile communication processing unit 300 includes a link information registration unit 320, a moving image request reception unit 322, a link information request unit 324, a link information reception unit 326, and a moving image output unit 328. The first communication terminal device 10a runs the server function in the streaming of moving images and originates a call in business wireless communication. The mobile communication unit 30 through the control unit 46 are as shown in FIG. 2 so that a description thereof is omitted. The processing unit 34 performs processes in coordination with the second communication terminal device 10b and the server device 20 and so will be described later along with those processes.

Figure 17:
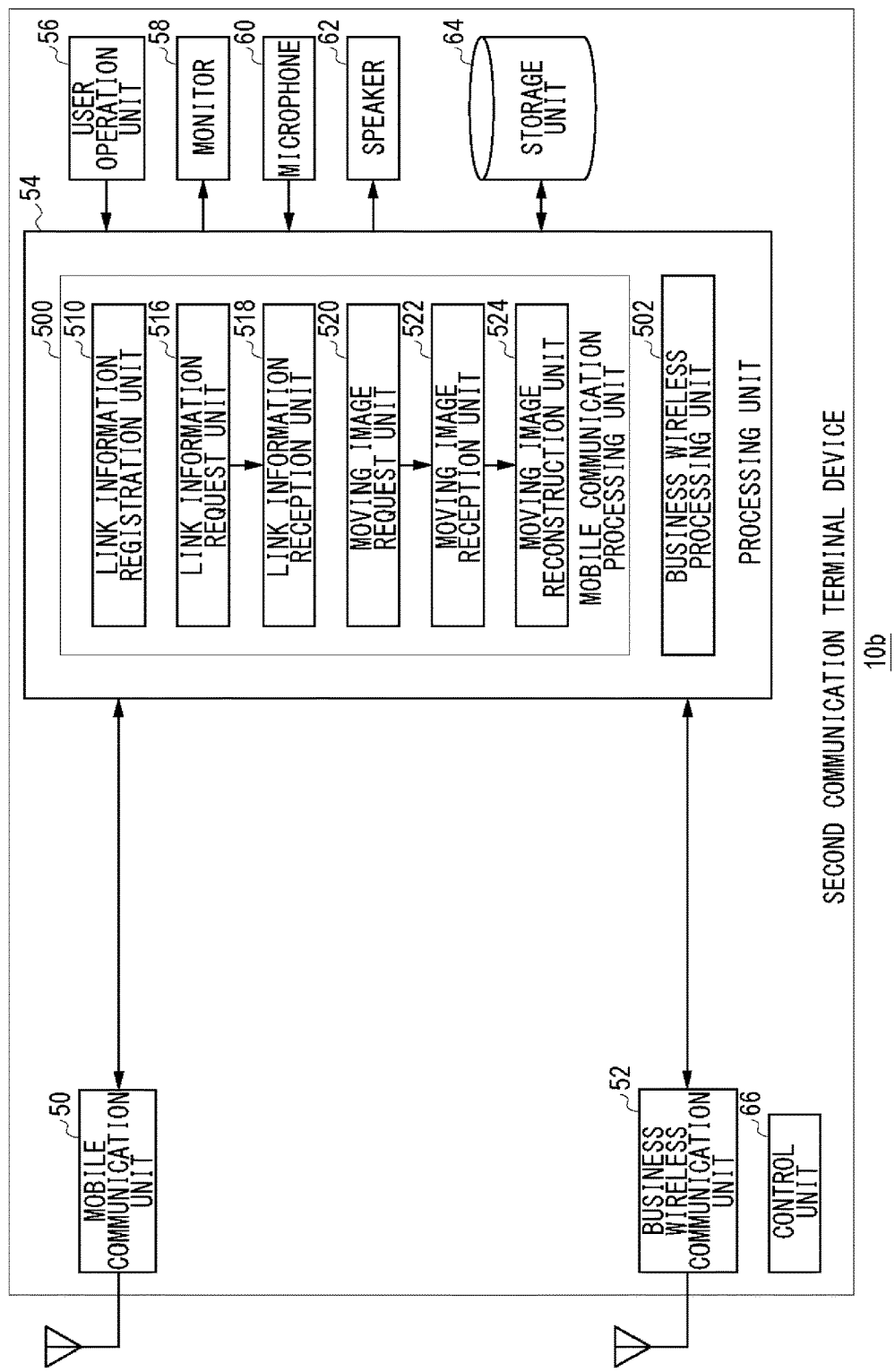
FIG. 17 shows the features of the second communication terminal device according to Embodiment 2.

FIG. 17 shows the features of the second communication terminal device 10b according to Embodiment 2. The mobile communication processing unit 500 includes a link information registration unit 510, a link information request unit 516, a link information reception unit 518, a moving image request unit 520, a moving image reception unit 522, and a moving image reconstruction unit 524. The second communication terminal device 10b runs the client function in the streaming of moving images and originates a call in business wireless communication. The mobile communication unit 50 through the control unit 66 are as shown in FIG. 3 so that a description thereof is omitted. The processing unit 54 performs processes in coordination with the first communication terminal device 10a and the server device 20 and so will be described later along with those processes.

A description will be given of processes in the processing unit 34 in the first communication terminal device 10a, the processing unit 54 in the second communication terminal device 10b, and the processing unit 72 in the server device 20. The mobile communication unit 50 of the second communication terminal device 10b receives an instruction and connects to the mobile communication base station device 12. The link information registration unit 510 of the second communication terminal device 10b transmits the link information of the second communication terminal device 10b to the server device 20 using mobile communication, thereby registering the link information in the server device 20. The processing unit 72 of the server device 20 receives the link information from the second communication terminal device 10b and causes the link information to be stored in the storage unit 74.

The mobile communication unit 30 of the first communication terminal device 10a receives an instruction and connects to the mobile communication base station device 12. The link information registration unit 320 of the first communication terminal device 10a transmits the link information of the first communication terminal device 10a to the server device 20 using mobile communication, thereby registering the link information in the server device 20. The processing unit 72 of the server device 20 receives the link information from the first communication terminal device 10a and causes the link information to be stored in the storage unit 74.

The monitor 58 of the second communication terminal device 10b displays a screen for prompting the user to enter an instruction. The screen is as shown in FIG. 7. When the user selects moving images, the link information request unit 516 of the second communication terminal device 10b requests the server device 20 to transmit link information using mobile communication. This causes a link information request to be transmitted to the server device 20. When the processing unit 72 of the server device 20 receives the link information request from the second communication terminal device 10b, the processing unit 72 acquires the link information from the storage unit 74 and transmits the link information to the second communication terminal device 10b. The link information reception unit 518 of the second communication terminal device 10b receives the link information from the server device 20 using mobile communication. Receiving the link information, the link information reception unit 518 stores the link information in the storage unit 64. The link information reception unit 518 also generates a moving image selection screen based on the link information and displays the screen on the monitor 58. The moving image selection screen is as shown in FIG. 9.

When the user selects arbitrary moving images in the moving image selection screen, the moving image request unit 520 of the second communication terminal device 10b transmits a request for the selected moving images to the server device 20 using mobile communication. The processing unit 72 of the server device 20 receives the moving image request from the second communication terminal device 10b and transmits the moving image request to the first communication terminal device 10a in accordance with the received moving image request. The moving image request reception unit 322 of the first communication terminal device 10a receives the moving image request from the server device 20. When the moving image request reception unit 322 receives the moving image request, the link information request unit 324 of the first communication terminal device 10a requests the server device 20 to transmit link information using mobile communication. This causes a link information request to be transmitted to the server device 20.

When the processing unit 72 of the server device 20 receives the link information request from the first communication terminal device 10a, the processing unit 72 acquires the link information from the storage unit 74 and transmits the link information to the first communication terminal device 10a. The link information reception unit 326 of the first communication terminal device 10a receives the link information from the server device 20 using mobile communication. Receiving the link information, the link information reception unit 312 stores the link information in the storage unit 44. The moving image output unit 328 of the first communication terminal device 10a transmits the moving image data stored in the storage unit 44 to the server device 20 in response to the moving image request.

The processing unit 72 of the server device 20 receives the moving image data from the first communication terminal device 10a. The processing unit 72 transmits the moving image data to the second communication terminal device 10b in accordance with the request for delivery of moving images and the determination as to whether to permit the delivery. Thus, the moving image data is delivered via the server device 20. When the processing unit 72 transmits the moving image data to the second communication terminal device 10b, the processing unit 72 gives a moving image delivery notification to the first communication terminal device 10a to notify the first communication terminal device 10a that the moving images are delivered. The mobile communication processing unit 300 of the first communication terminal device 10a receives the moving image delivery notification from the server device 20 using mobile communication.

The moving image reception unit 522 of the second communication terminal device 10b receives the moving image data from the server device 20 using mobile communication. The moving image reception unit 522 outputs the received moving image data to the moving image reconstruction unit 524. The moving image reconstruction unit 524 of the second communication terminal device 10b reconstructs the moving image data from the moving image reception unit 522 and displays the reconstructed moving image data on the monitor 58.

Thus, the first communication terminal device 10a delivers the moving image data using mobile communication based on the first information included in the link information. When a destination of voice transmission is selected and PTT is initiated by a user operation in this situation in order to transmit voice to the destination of delivery of moving images, the business wireless processing unit 302 performs voice transmission. Voice communication using business wireless communication is as described above and a description thereof is omitted.

Figure 18:
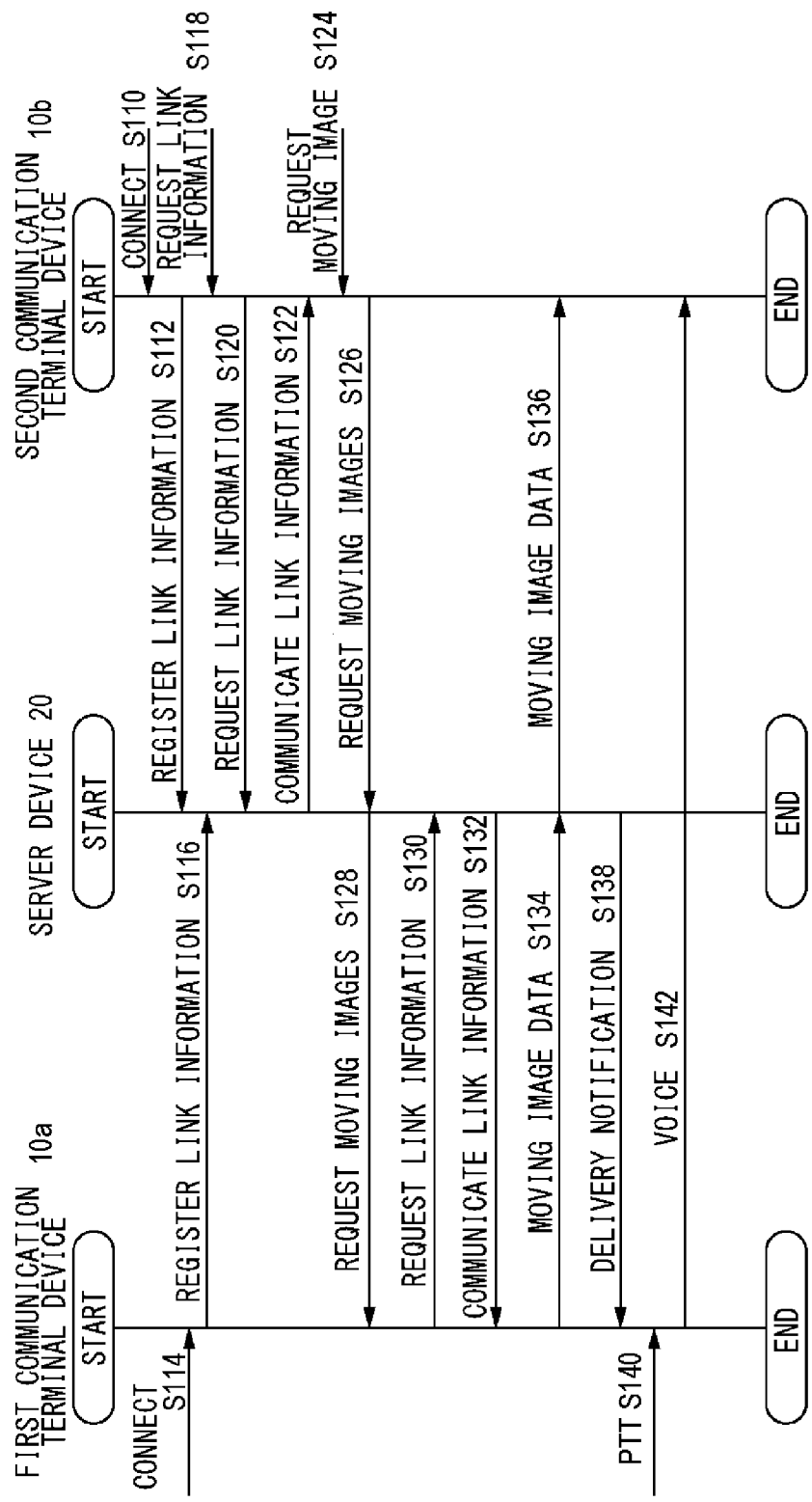
FIG. 18 is a sequence diagram showing the steps of communication in the communication system according to Embodiment 2.

FIG. 18 is a sequence diagram showing the steps of communication in the communication system 100 according to Embodiment 2. The second communication terminal device 10b performs connection using mobile communication (S110). The second communication terminal device 10b registers the link information in the server device 20 (S112). The first communication terminal device 10a performs connection using mobile communication (S114). The first communication terminal device 10a registers the link information in the server device 20 (S116). A link information request is entered in the second communication terminal device 10b (S118). The second communication terminal device 10b transmits the link information request to the server device 20 (S120). The server device 20 communicates the link information to the second communication terminal device 10b (S122).

A moving image request is entered in the second communication terminal device 10b (S124). The second communication terminal device 10b transmits the moving image request to the server device 20 (S126) and the server device 20 transmits the moving image request to the first communication terminal device 10a (S128). The first communication terminal device 10a transmits the link information request to the server device 20 (S130). The server device 20 communicates the link information to the first communication terminal device 10a (S132). The first communication terminal device 10a transmits the moving image data to the server device 20 (S134) and the server device 20 transmits the moving image data to the second communication terminal device 10b (S136). The server device 20 communicates a notification of delivery to the first communication terminal device 10a (S138). The button in the user operation unit 36 in the first communication terminal device 10a is pressed for PTT (S140). The first communication terminal device 10a transmits voice to the second communication terminal device 10b (S142).

According to the embodiment, the link information on the second communication terminal device is received. Therefore, in originating a call to the second communication terminal device using business wireless communication while the moving image data is being delivered using mobile communication to the second communication terminal device, the wireless CH of the second communication terminal device can be identified based on the second information in the link information. Since the wireless CH of the second communication terminal device is automatically identified while the moving image data is being delivered using mobile communication, the user operation is prevented from becoming too complicated in a device compatible with a plurality of communication schemes.

Embodiment 3

A description will now be given of Embodiment 3. Like the embodiments described above, Embodiment 3 also relates to a communication system including two wireless communication schemes. Communication terminal devices described so far deliver moving images in response to a moving image request. Meanwhile, the communication terminal device according to Embodiment 3 broadcasts moving images and performs voice communication using business wireless communication with the other communication terminal device receiving the moving images. In broadcasting the moving images, the communication terminal device does not recognize the other communication terminal device receiving the moving images. In order to prevent the user operation from becoming too complicated in this process, the communication terminal device accesses the server device upon receiving a viewing report from the other communication terminal device receiving the broadcast moving images and acquires the link information from the server device. The communication terminal device acquires the wireless CH from the link information and performs voice communication using business wireless communication. The communication system and the server device according to Embodiment 3 are of the same type as those of FIGS. 1 and 4. The following description concerns a difference from the embodiments described above.

Figure 19:
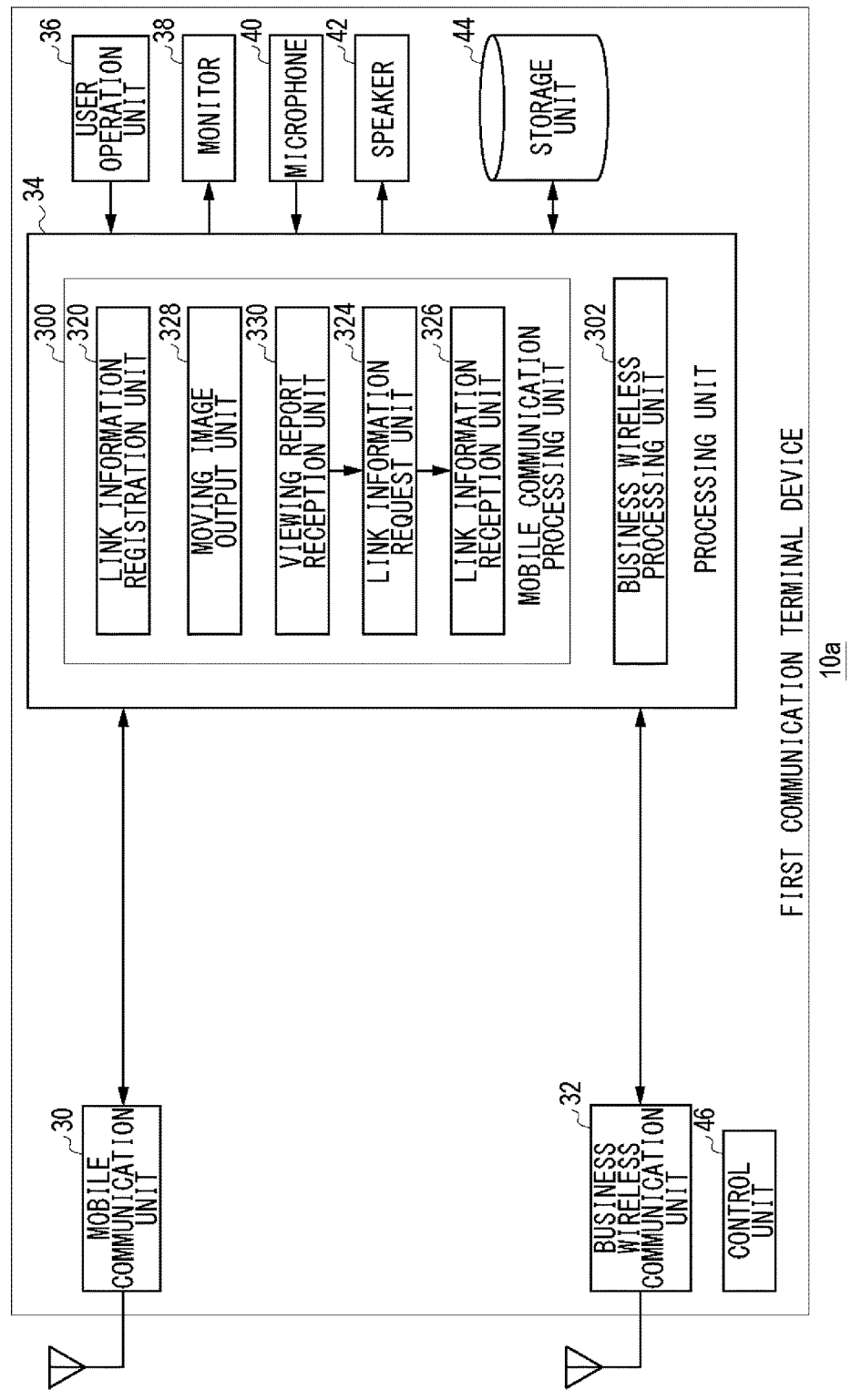
FIG. 19 shows the features of the first communication terminal device according to Embodiment 3.

FIG. 19 shows the features of the first communication terminal device 10a according to Embodiment 3. The mobile communication processing unit 300 includes a link information registration unit 320, a moving image output unit 328, a viewing report reception unit 330, a link information request unit 324, and a link information reception unit 326. The first communication terminal device 10a runs the server function in the streaming of moving images and receives a call in business wireless communication. Streaming in Embodiment 3 is broadcast transmission. The mobile communication unit 30 through the control unit 46 are as shown in FIG. 2 so that a description thereof is omitted. The processing unit 34 performs processes in coordination with the second communication terminal device 10b and the server device 20 and so will be described later along with those processes.

Figure 20:
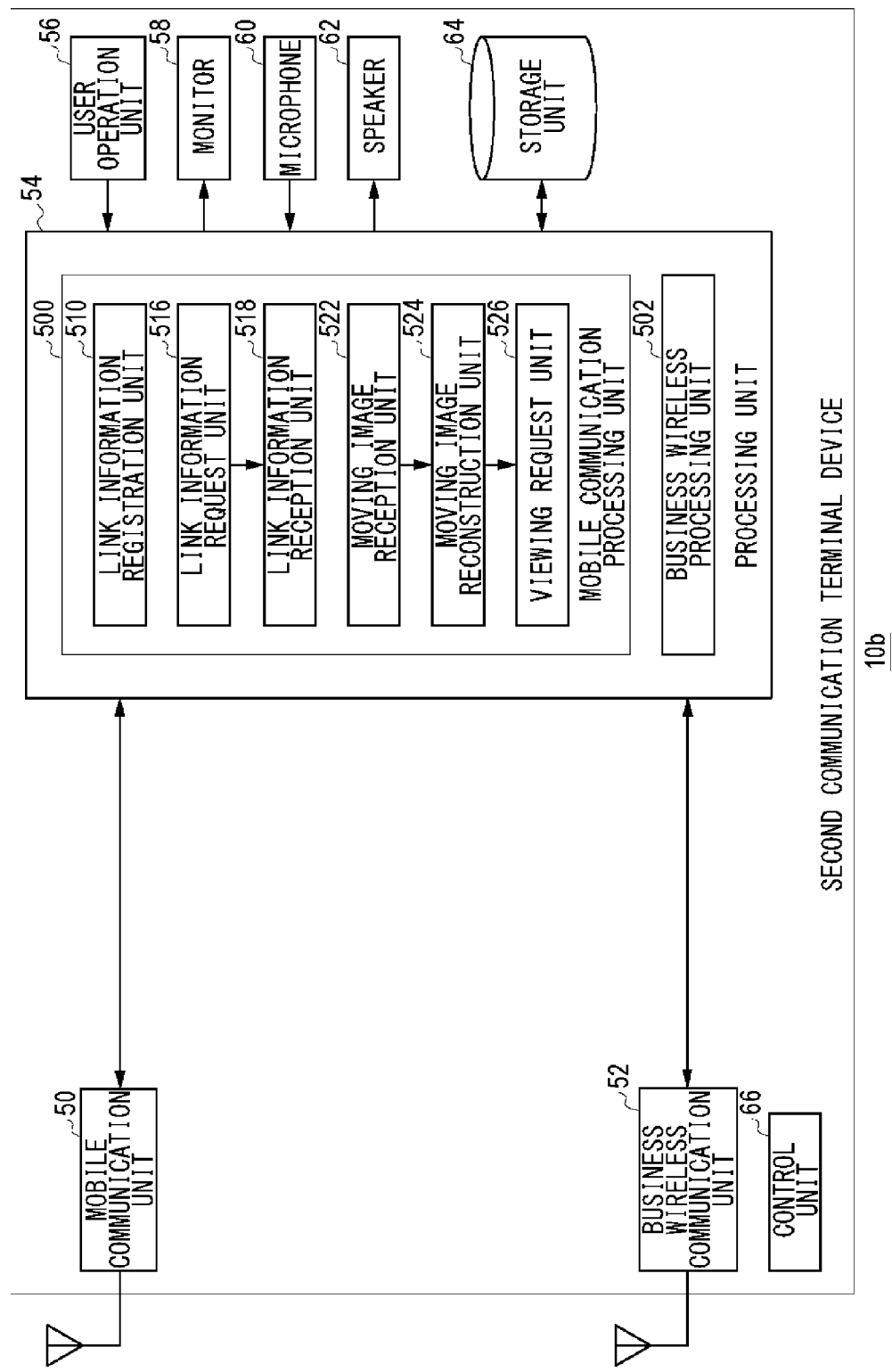
FIG. 20 shows the features of the second communication terminal device according to Embodiment 3.

FIG. 20 shows the features of the second communication terminal device 10b according to Embodiment 3. The mobile communication processing unit 500 includes the link information registration unit 510, the link information request unit 516, the link information reception unit 518, the moving image reception unit 522, the moving image reconstruction unit 524, and a viewing report unit 526. The second communication terminal device 10b runs the client function in the streaming of moving images and receives a call in business wireless communication. The mobile communication unit 50 through the control unit 66 are as shown in FIG. 3 so that a description thereof is omitted. The processing unit 54 performs processes in coordination with the first communication terminal device 10a and the server device 20 and so will be described later along with those processes.

A description will be given of processes in the processing unit 34 in the first communication terminal device 10a, the processing unit 54 in the second communication terminal device 10b, and the processing unit 72 in the server device 20. The mobile communication unit 50 of the second communication terminal device 10b receives an instruction and connects to the mobile communication base station device 12. The link information registration unit 510 of the second communication terminal device 10b transmits the link information of the second communication terminal device 10b to the server device 20 using mobile communication, thereby registering the link information in the server device 20. The processing unit 72 of the server device 20 receives the link information from the second communication terminal device 10b and causes the link information to be stored in the storage unit 74.

The mobile communication unit 30 of the first communication terminal device 10a receives an instruction and connects to the mobile communication base station device 12. The link information registration unit 320 of the first communication terminal device 10a transmits the link information of the first communication terminal device 10a to the server device 20 using mobile communication, thereby registering the link information in the server device 20. The processing unit 72 of the server device 20 receives the link information from the first communication terminal device 10a and causes the link information to be stored in the storage unit 74.

The monitor 58 of the second communication terminal device 10b displays a screen for prompting the user to enter an instruction. The screen is as shown in FIG. 7. When the user selects moving images, the link information request unit 516 of the second communication terminal device 10b requests the server device 20 to transmit link information using mobile communication. This causes a link information request to be transmitted to the server device 20. When the processing unit 72 of the server device 20 receives the link information request from the second communication terminal device 10b, the processing unit 72 acquires the link information from the storage unit 74 and transmits the link information to the second communication terminal device 10b. The link information reception unit 518 of the second communication terminal device 10b receives the link information from the server device 20 using mobile communication. Receiving the link information, the link information reception unit 518 stores the link information in the storage unit 64.

The moving image output unit 328 of the first communication terminal device 10a transmits the moving image data stored in the storage unit 44 to the server device 20. The processing unit 72 of the server device 20 receives the moving image data from the first communication terminal device 10a. The processing unit 72 broadcasts the moving image data. This is equivalent to the first communication terminal device 10a broadcasting the moving image data.

The moving image reception unit 522 of the second communication terminal device 10b receives the moving image data broadcast from the server device 20 using mobile communication, based on the link information received in the link information reception unit 518, and, more particularly, the IP address (first information). The moving image reception unit 522 outputs the received moving image data to the moving image reconstruction unit 524. The moving image reconstruction unit 524 of the second communication terminal device 10b reconstructs the moving image data from the moving image reception unit 522 and displays the reconstructed moving image data on the monitor 58. When the moving image reconstruction unit 524 reconstructs the moving image data, the viewing report unit 526 of the second communication terminal device 10b transmits a moving image viewing report to the server device 20 using mobile communication to notify the server device 20 accordingly. In other words, the moving image viewing report represents information for indicating that the second communication terminal device 10b is receiving the delivery of moving images based on the first information included in the link information. Receiving the moving image viewing report from the second communication terminal device 10b, the processing unit 72 of the server device 20 transmits the moving image viewing report to the first communication terminal device 10a. Receiving the moving image viewing report from the server device 20 using mobile communication, the viewing report reception unit 330 of the first communication terminal device 10a recognizes that the second communication terminal device 10b is reconstructing the moving image data.

When the viewing report reception unit 330 receives the moving image viewing report, the link information request unit 324 of the first communication terminal device 10a requests the server device 20 to transmit link information using mobile communication. This causes a link information request to be transmitted to the server device 20. When the processing unit 72 of the server device 20 receives the link information request from the first communication terminal device 10a, the processing unit 72 acquires the link information from the storage unit 74 and transmits the link information to the first communication terminal device 10a. The link information reception unit 326 of the first communication terminal device 10a receives the link information from the server device 20 using mobile communication. Receiving the link information, the link information reception unit 312 stores the link information in the storage unit 44.

Thus, the first communication terminal device 10a delivers the moving image data by broadcasting it using mobile communication and receives a moving image viewing report using mobile communication. When a destination of voice transmission is selected and PTT is initiated by a user operation in this situation in order to transmit voice to the destination of delivery of moving images, the business wireless processing unit 302 performs voice transmission. Voice communication using business wireless communication is as described above and a description thereof is omitted.

Figure 21:
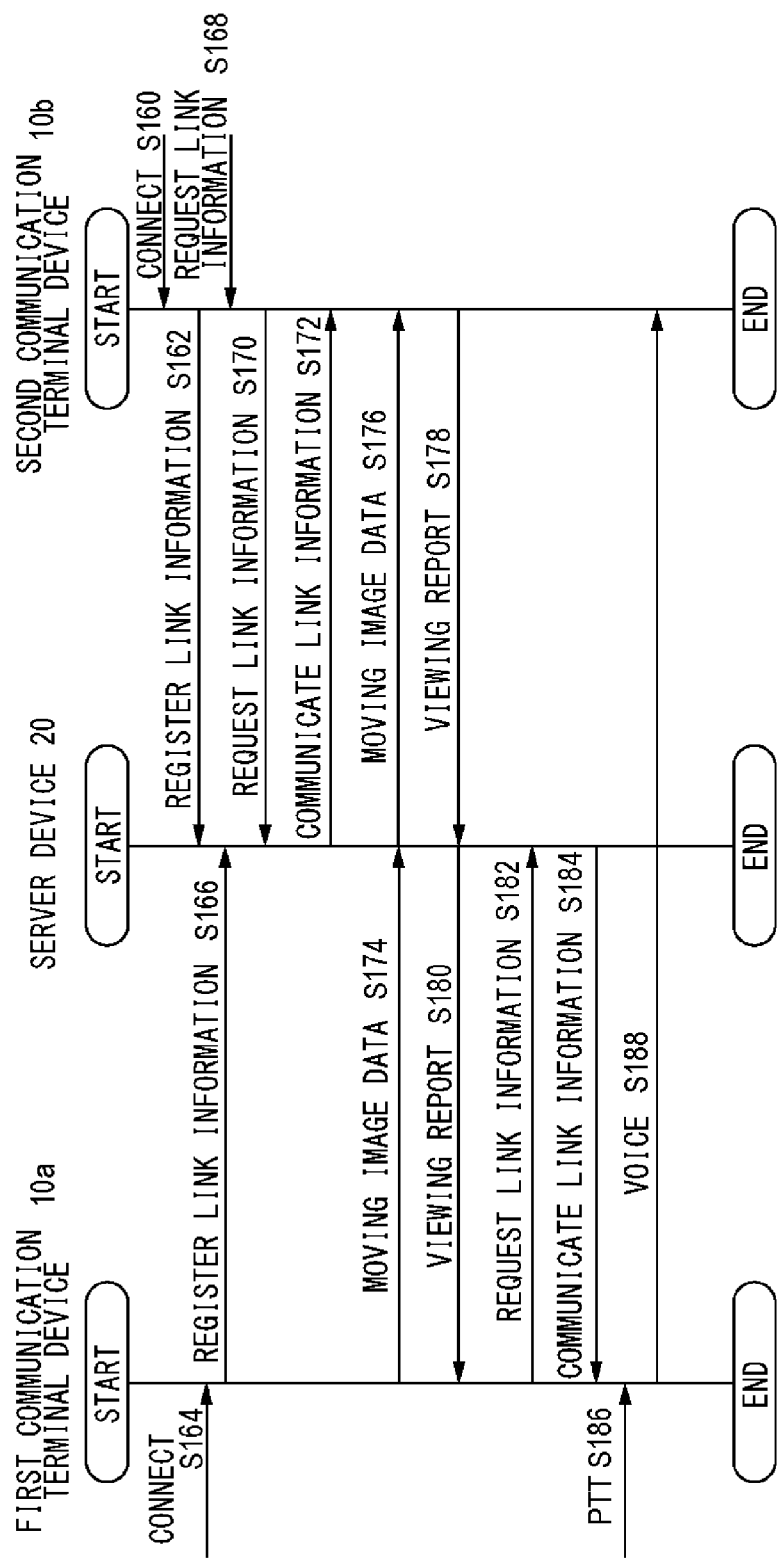
FIG. 21 is a sequence diagram showing the steps of communication in the communication system according to Embodiment 3.

FIG. 21 is a sequence diagram showing the steps of communication in the communication system 100 according to Embodiment 3. The second communication terminal device 10b performs connection using mobile communication (S160). The second communication terminal device 10b registers the link information in the server device 20 (S162). The first communication terminal device 10a performs connection using mobile communication (S164). The first communication terminal device 10a registers the link information in the server device 20 (S166). A link information request is entered in the second communication terminal device 10b (S168). The second communication terminal device 10b transmits the link information request to the server device 20 (S170). The server device 20 communicates the link information to the second communication terminal device 10b (S172).

The first communication terminal device 10a transmits the moving image data to the server device 20 (S174) and the server device 20 transmits the moving image data to the second communication terminal device 10b (S176). The second communication terminal device 10b transmits the viewing report to the server device 20 (S178) and the server device 20 transmits the viewing report to the first communication terminal device 10a (S180). The first communication terminal device 10a transmits the link information request to the server device 20 (S182). The server device 20 communicates the link information to the first communication terminal device 10a (S184). The button in the user operation unit 36 in the first communication terminal device 10a is pressed for PTT (S186). The first communication terminal device 10a transmits voice to the second communication terminal device 10b (S188).

According to the embodiment, the link information on the second communication terminal device is received. Therefore, in originating a call to the second communication terminal device using business wireless communication while the moving image data is being broadcast using mobile communication to the second communication terminal device, the wireless CH of the second communication terminal device can be identified based on the second information in the link information. Since the wireless CH of the second communication terminal device is automatically identified while the moving image data is being broadcast using mobile communication, the user operation is prevented from becoming too complicated in a device compatible with a plurality of communication schemes. Further, since the viewing report is received, the communication terminal device reconstructing the broadcast moving image data can be recognized.

Embodiment 4

A description will be Embodiment 4. Like the embodiments described above, Embodiment 4 also relates to a communication system including two wireless communication schemes. The communication terminal device according to Embodiment 1 receiving moving images using mobile communication performs voice communication using business wireless communication with the other communication terminal device originating the moving images. In addition, the communication terminal device acquires the link information from the server device in order to implement the process. Meanwhile, Embodiment 4 also involves the delivery of moving images and voice communication in a situation similar to that of Embodiment 1 but does not include a server device. The first communication terminal device 10a according to Embodiment 4 is of the same type as that of FIG. 2. The following description concerns a difference from the embodiments described above.

Figure 22:
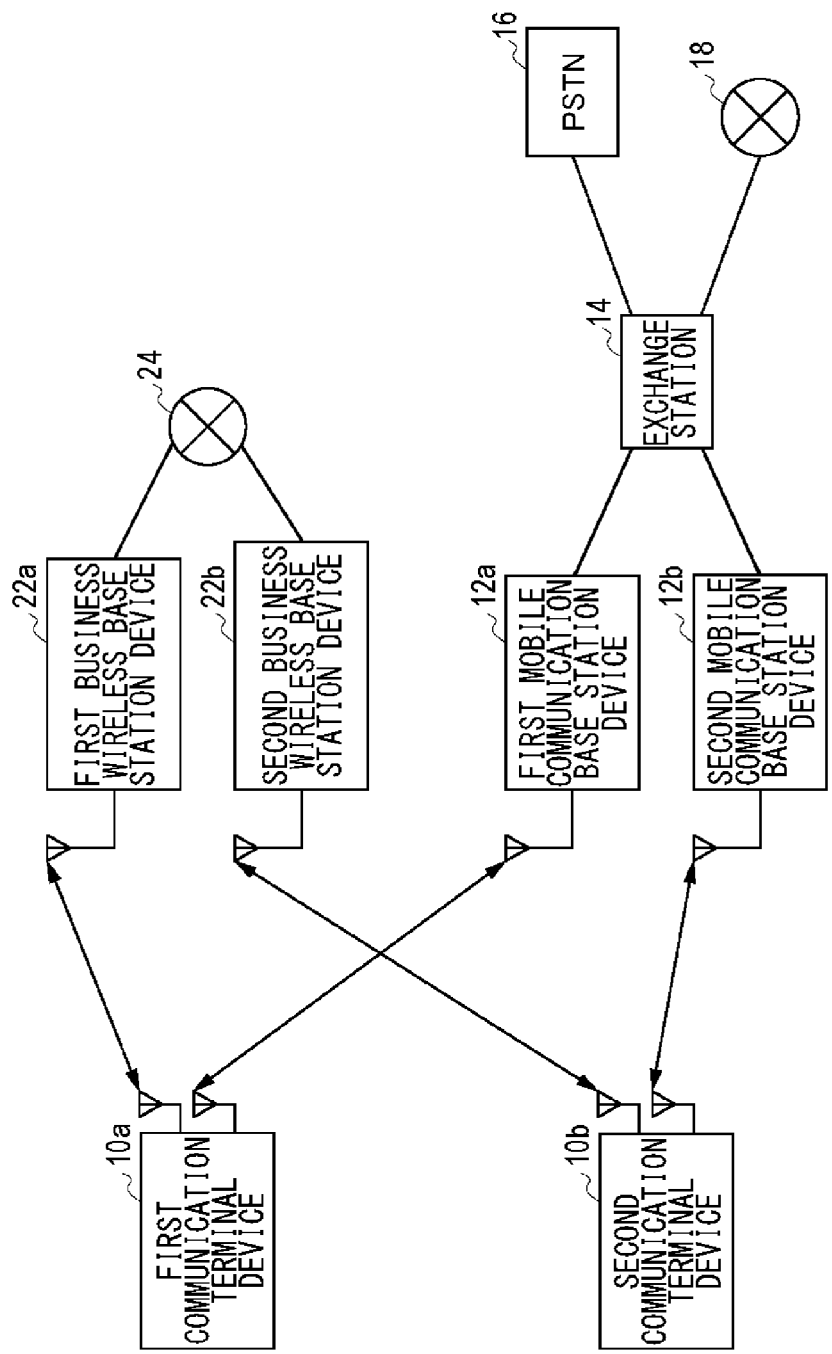
FIG. 22 shows the features of a communication system according to Embodiment 4.

FIG. 22 shows the features of a communication system 100 according to Embodiment 4. As contrasted with FIG. 1, the communication system 100 does not include the server device 20. In FIG. 1, the server device 20 stores and manages the link information, but in this case the first communication terminal device 10a and the second communication terminal device 10b store and manage the link information. For this reason, the first communication terminal device 10a and the second communication terminal device 10b transmit or receive the link information via the first mobile communication base station device 12a, the exchange station 14, and the second mobile communication base station device 12b. According to this configuration, the first communication terminal device 10a and the second communication terminal device 10b are capable of exchanging the link information directly.

Figure 23:
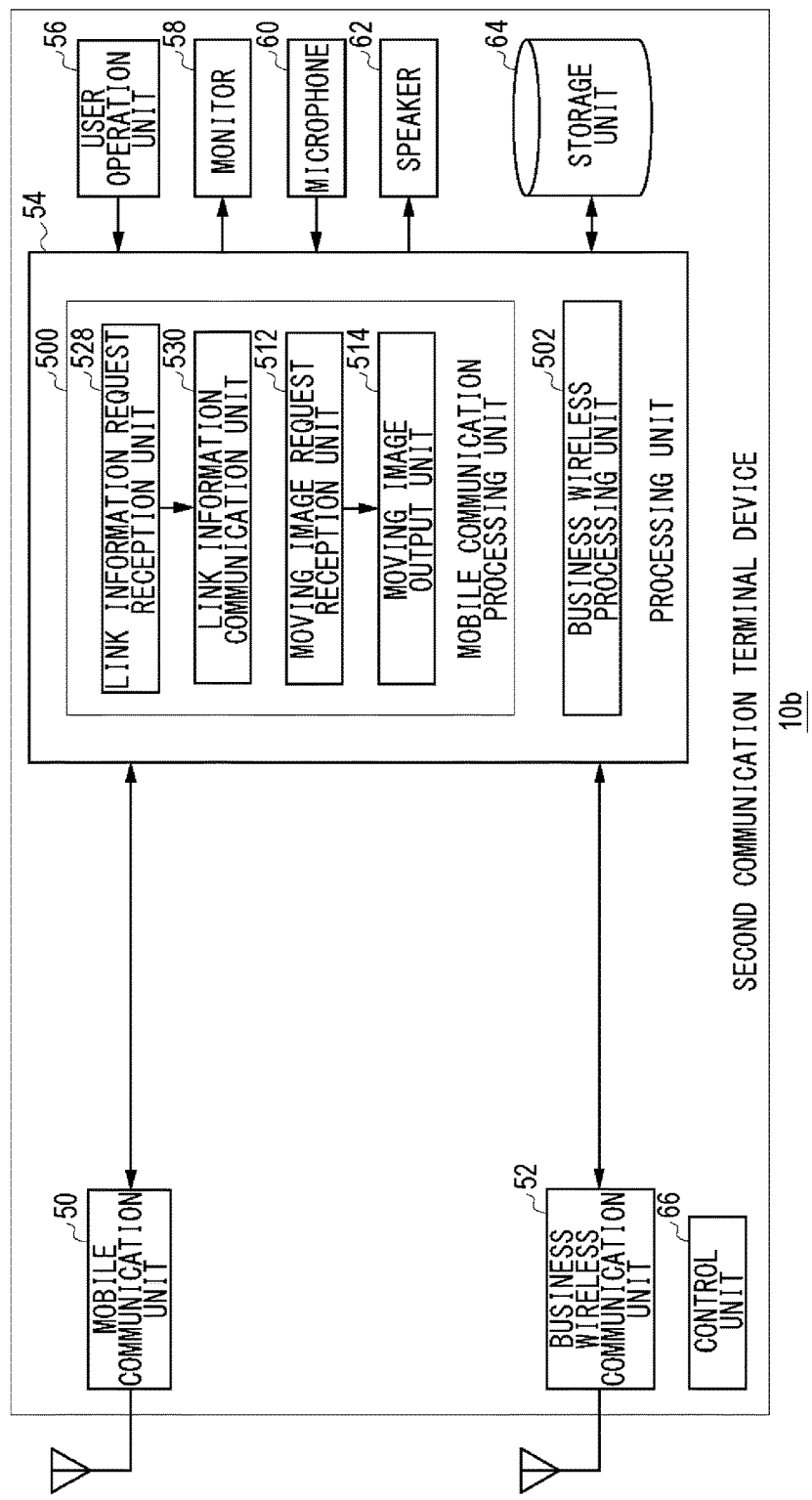
FIG. 23 shows the features of the second communication terminal device of FIG. 22.

FIG. 23 shows the features of the second communication terminal device 10b. The mobile communication processing unit 500 includes a link information request reception unit 528, a link information communication unit 530, a moving image request reception unit 512, and a moving image output unit 514. The second communication terminal device 10b runs the server function in the streaming of moving images and receives a call in business wireless communication. The mobile communication unit 50 through the control unit 66 are as shown in FIG. 3 so that a description thereof is omitted.

A description will be given of processes in the processing unit 34 in the first communication terminal device 10a and the processing unit 54 in the second communication terminal device 10b. The monitor 38 of the first communication terminal device 10a displays a screen for prompting the user to enter an instruction. When the user selects moving images, the link information request unit 310 of the first communication terminal device 10a requests the second communication terminal device 10b to transmit link information using mobile communication. This causes a link information request to be transmitted to the second communication terminal device 10b. The link information request reception unit 528 of the second communication terminal device 10b receives the link information request from the first communication terminal device 10a using mobile communication. The link information communication unit 530 of the second communication terminal device 10b transmits the link information of the second communication terminal device 10b to the first communication terminal device 10a using mobile communication.

The link information reception unit 312 of the first communication terminal device 10a receives the link information from the second communication terminal device 10b using mobile communication. Receiving the link information, the link information reception unit 312 stores the link information in the storage unit 44. The link information reception unit 312 also generates a moving image selection screen based on the link information and displays the screen on the monitor 38. When the user selects arbitrary moving images in the moving image selection screen, the moving image request unit 314 of the first communication terminal device 10a transmits a request for the selected moving images to the second communication terminal device 10b using mobile communication.

The moving image request reception unit 512 of the second communication terminal device 10b receives the moving image request from the first communication terminal device 10a using mobile communication. The moving image output unit 514 of the second communication terminal device 10b transmits the moving image data stored in the storage unit 64 to the first communication terminal device 10a using mobile communication in response to the moving image request. The moving image reception unit 316 of the first communication terminal device 10a receives the moving image data from the second communication terminal device 10b using mobile communication. The moving image reception unit 316 outputs the received moving image data to the moving image reconstruction unit 318. The moving image reconstruction unit 318 of the first communication terminal device 10a reconstructs the moving image data from the moving image reception unit 316 and displays the reconstructed moving image data on the monitor 38.

Thus, the first communication terminal device 10a receives the delivery of moving image data based on the first information included in the link information. When a destination of voice transmission is selected and PTT is initiated by a user operation in this situation in order to transmit voice to the source of delivery of moving images being viewed, the business wireless processing unit 302 performs voice transmission. Voice communication using business wireless communication is as described above and a description thereof is omitted.

Figure 24:
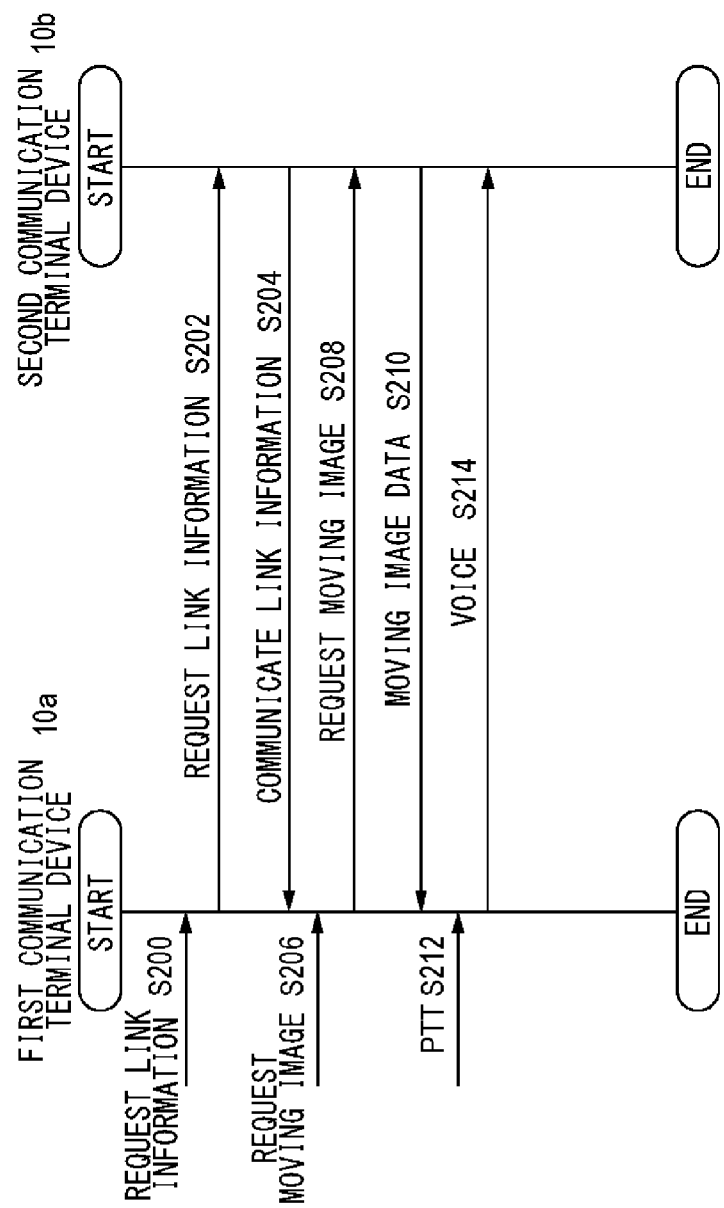
FIG. 24 is a sequence diagram showing the steps of communication in the communication system of FIG. 22.

FIG. 24 is a sequence diagram showing the steps of communication in the communication system 100. A link information request is entered in the first communication terminal device 10a (S200). The first communication terminal device 10a transmits a link information request to the second communication terminal device 10b (S202). The second communication terminal device 10b communicates the link information to the first communication terminal device 10a (S204). A moving image request is entered in the first communication terminal device 10a (S206). The first communication terminal device 10a transmits the moving image request to the second communication terminal device 10b (S208). The second communication terminal device 10b transmits the moving image data to the first communication terminal device 10a (S210). The button in the user operation unit 36 in the first communication terminal device 10a is pressed for PTT (S212). The first communication terminal device 10a transmits voice to the second communication terminal device 10b (S214).

According to the embodiment, the link information on the second communication terminal device is received. Therefore, in originating a call to the second communication terminal device using business wireless communication while the moving image data is being received using mobile communication from the second communication terminal device, the wireless CH of the second communication terminal device can be identified based on the second information in the link information. Since the link information is received in advance, the wireless CH of the second communication terminal device can be automatically identified. Since the wireless CH of the second communication terminal device is automatically identified while the moving image data is being received using mobile communication, the user operation is prevented from becoming too complicated in a device compatible with a plurality of communication schemes. Since the wireless CH of the second communication terminal device is automatically identified while mobile communication is being performed, the user operation is prevented from becoming too complicated in a device compatible with a plurality of communication schemes. Since the link information is directly transmitted between communication terminal devices, the server device is made unnecessary. Since the server device is made unnecessary, the configuration can be simplified.

Embodiment 5

A description will now be given of Embodiment 5. Like the embodiments described above, Embodiment 5 also relates to a communication system including two wireless communication schemes. The communication terminal device according to Embodiment 2 transmitting moving images using mobile communication performs voice communication using business wireless communication with the other communication terminal device that is the destination of moving images. In addition, the communication terminal device acquires the link information from the server device in order to implement the process. Meanwhile, Embodiment 5 also involves the delivery of moving images and voice communication in a situation similar to that of Embodiment 2 but does not include a server device. The communication system according to Embodiment 5 is of the same type as those of FIG. 22. The following description concerns a difference from the embodiments described above.

Figure 25:
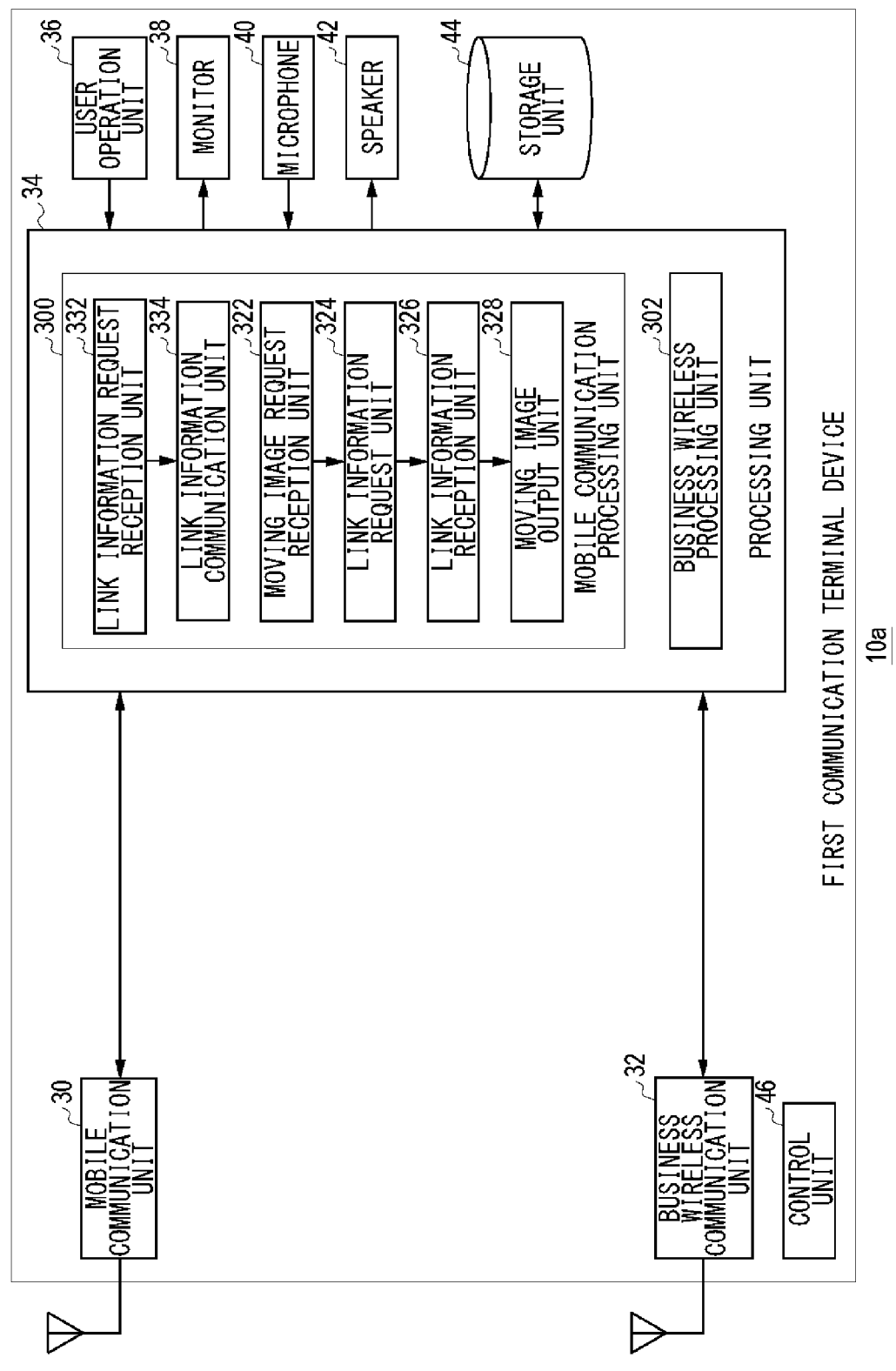
FIG. 25 shows the features of the first communication terminal device according to Embodiment 5.

FIG. 25 shows the features of the first communication terminal device 10a according to Embodiment 5. The mobile communication processing unit 300 includes a link information request reception unit 332, a link information communication unit 334, the moving image request reception unit 322, the link information request unit 324, the link information reception unit 326, and the moving image output unit 328. The first communication terminal device 10a runs the server function in the streaming of moving images and originates a call in business wireless communication. The mobile communication unit 30 through the control unit 46 are as shown in FIG. 2 so that a description thereof is omitted.

Figure 26:
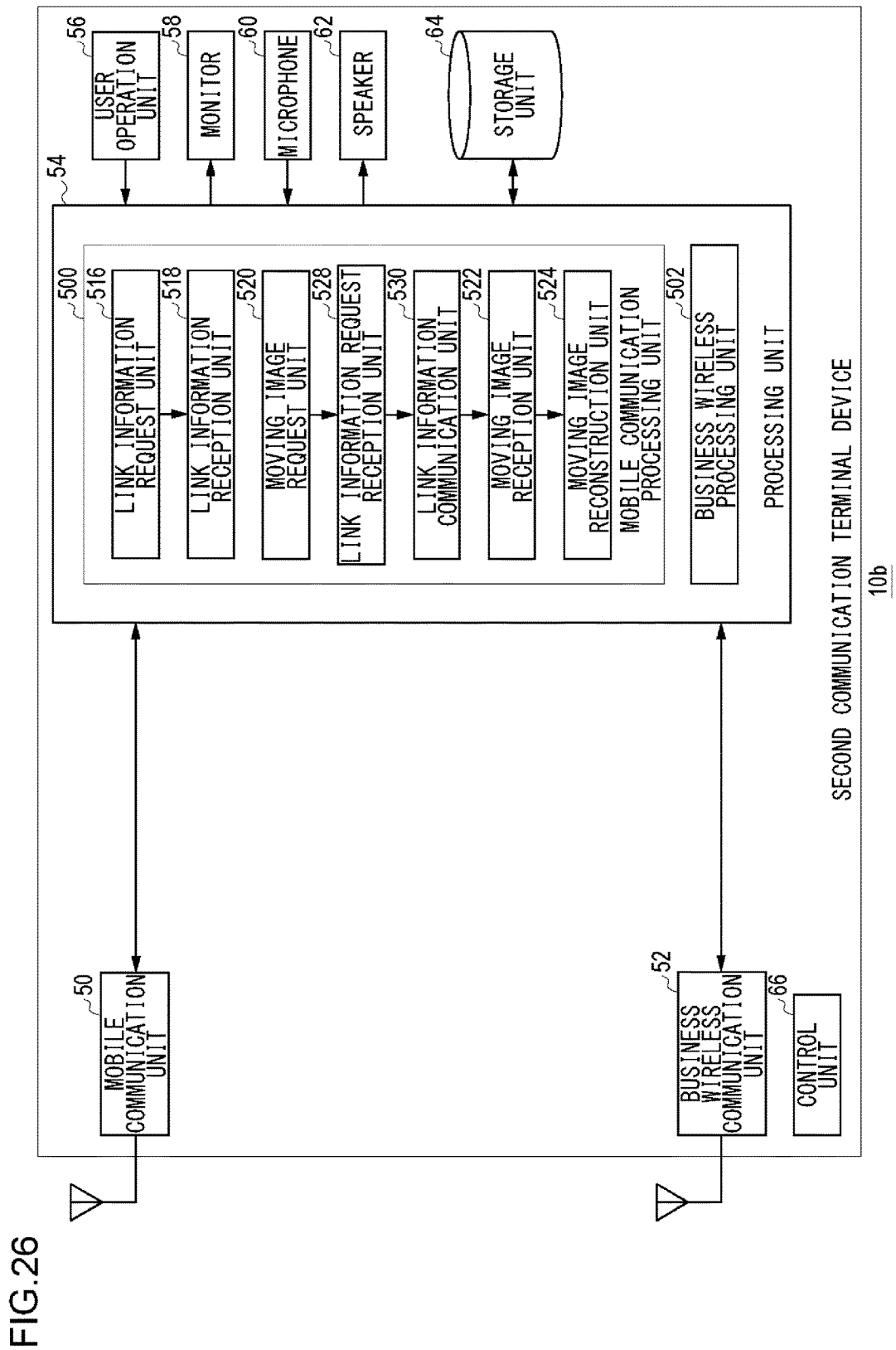
FIG. 26 shows the features of the second communication terminal device according to Embodiment 5.

FIG. 26 shows the features of the second communication terminal device 10b according to Embodiment 5. The mobile communication processing unit 500 includes the link information request unit 516, the link information reception unit 518, the moving image request unit 520, the link information request reception unit 528, the link information communication unit 530, the moving image reception unit 522, and the moving image reconstruction unit 524. The second communication terminal device 10b runs the client function in the streaming of moving images and receives a call in business wireless communication. The mobile communication unit 50 through the control unit 66 are as shown in FIG. 3 so that a description thereof is omitted.

A description will be given of processes in the processing unit 34 in the first communication terminal device 10a and the processing unit 54 in the second communication terminal device 10b. The monitor 58 of the second communication terminal device 10b displays a screen for prompting the user to enter an instruction. When the user selects moving images, the link information request unit 516 of the second communication terminal device 10b requests the first communication terminal device 10a to transmit link information using mobile communication. This causes a link information request to be transmitted to the first communication terminal device 10a. The link information request reception unit 332 of the first communication terminal device 10a receives the link information from the second communication terminal device 10b using mobile communication. The link information communication unit 334 of the first communication terminal device 10a transmits the link information of the first communication terminal device 10a to the second communication terminal device 10b using mobile communication.

The link information reception unit 518 of the second communication terminal device 10b receives the link information from the first communication terminal device 10a using mobile communication. Receiving the link information, the link information reception unit 518 stores the link information in the storage unit 64. The link information reception unit 518 also generates a moving image selection screen based on the link information and displays the screen on the monitor 58. When the user selects arbitrary moving images in the moving image selection screen, the moving image request unit 520 of the second communication terminal device 10b transmits a request for the selected moving images to the first communication terminal device 10a using mobile communication.

The moving image request reception unit 322 of the first communication terminal device 10a receives the moving image request from the second communication terminal device 10b. When the moving image request reception unit 322 receives the moving image request, the link information request unit 324 of the first communication terminal device 10a requests the second communication terminal device 10b to transmit link information using mobile communication. This causes a link information request to be transmitted to the second communication terminal device 10b. The link information request reception unit 528 of the second communication terminal device 10b receives the link information request from the first communication terminal device 10a using mobile communication. The link information communication unit 530 of the second communication terminal device 10b transmits the link information of the second communication terminal device 10b to the first communication terminal device 10a using mobile communication.

The link information reception unit 326 of the first communication terminal device 10a receives the link information from the second communication terminal device 10b using mobile communication. Receiving the link information, the link information reception unit 312 stores the link information in the storage unit 44. The moving image output unit 328 of the first communication terminal device 10a transmits the moving image data stored in the storage unit 44 to the second communication terminal device 10b in response to the moving image request. The moving image reception unit 522 of the second communication terminal device 10b receives the moving image data from the first communication terminal device 10a using mobile communication. The moving image reception unit 522 outputs the received moving image data to the moving image reconstruction unit 524. The moving image reconstruction unit 524 of the second communication terminal device 10b reconstructs the moving image data from the moving image reception unit 522 and displays the reconstructed moving image data on the monitor 58.

Thus, the first communication terminal device 10a delivers the moving image data using mobile communication based on the first information included in the link information. When a destination of voice transmission is selected and PTT is initiated by a user operation in this situation in order to transmit voice to the destination of delivery of moving images, the business wireless processing unit 302 performs voice transmission. Voice communication using business wireless communication is as described above and a description thereof is omitted.

Figure 27:
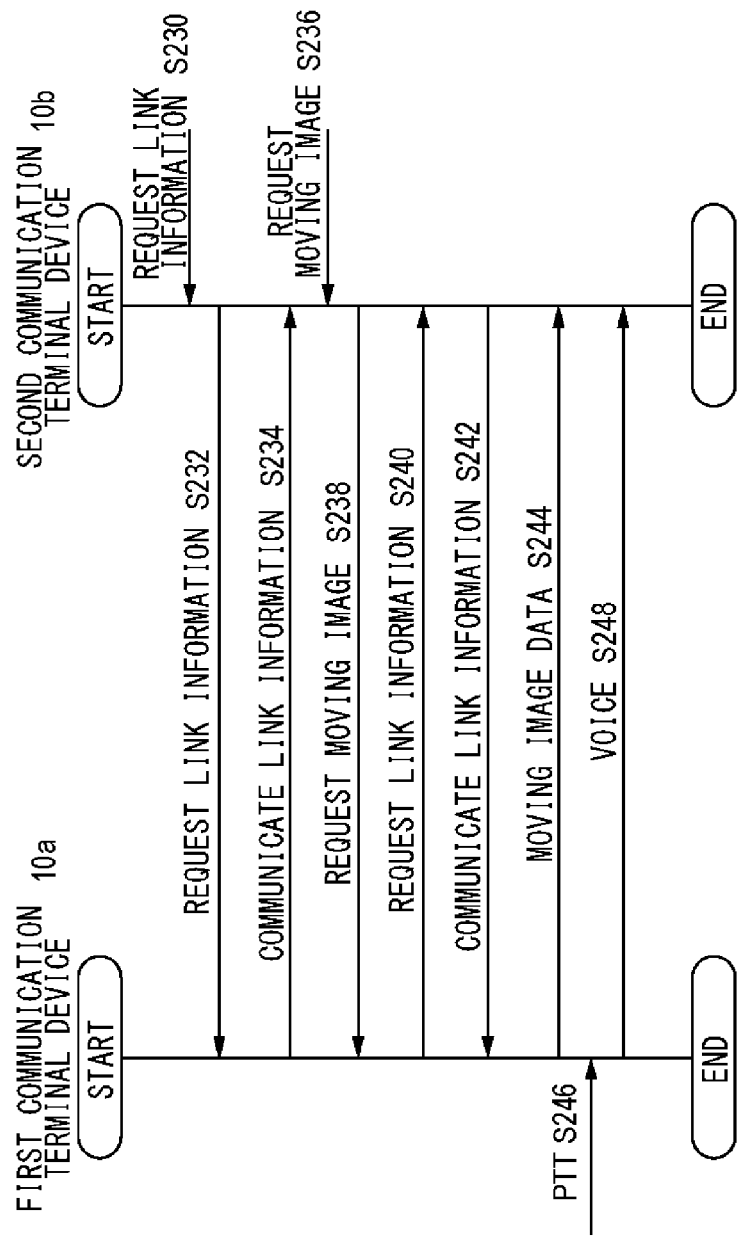
FIG. 27 is a sequence diagram showing the steps of communication in the communication system according to Embodiment 5.

FIG. 27 is a sequence diagram showing the steps of communication in the communication system 100 according to Embodiment 5. A link information request is entered in the second communication terminal device 10b (S230). The second communication terminal device 10b transmits a link information request to the first communication terminal device 10a (S232). The first communication terminal device 10a communicates the link information to the second communication terminal device 10b (S234). A moving image request is entered in the second communication terminal device 10b (S236). The second communication terminal device 10b transmits the moving image request to the first communication terminal device 10a (S238). The first communication terminal device 10a transmits a link information request to the second communication terminal device 10b (S240). The second communication terminal device 10b communicates the link information to the first communication terminal device 10a (S242). The first communication terminal device 10a transmits the moving image data to the second communication terminal device 10b (S244). The button in the user operation unit 36 in the first communication terminal device 10a is pressed for PTT (S246). The first communication terminal device 10a transmits voice to the second communication terminal device 10b (S248).

According to the embodiment, the link information on the second communication terminal device is received. Therefore, in originating a call to the second communication terminal device using business wireless communication while the moving image data is being delivered using mobile communication to the second communication terminal device, the wireless CH of the second communication terminal device can be identified based on the second information in the link information. Since the wireless CH of the second communication terminal device is automatically identified while the moving image data is being delivered using mobile communication, the user operation is prevented from becoming too complicated in a device compatible with a plurality of communication schemes. Since the link information is directly transmitted between communication terminal devices, the server device is made unnecessary. Since the server device is made unnecessary, the configuration can be simplified.

Embodiment 6

A description will now be given of Embodiment 6. Like the embodiments described above, Embodiment 6 also relates to a communication system including two wireless communication schemes. The communication terminal device according to Embodiment 3 broadcasts moving images and performs voice communication using business wireless communication with the other communication terminal device receiving the moving images. In order to implement such a process, the communication terminal device accesses the server device upon receiving a viewing report from the other communication terminal device receiving the broadcast moving images and acquires the link information from the server device. Meanwhile, Embodiment 6 also involves broadcasting of moving images and voice communication in a situation similar to that of Embodiment 3 but does not include a server device. The communication system according to Embodiment 6 is of the same type as those of FIG. 22. The following description concerns a difference from the embodiments described above.

Figure 28:
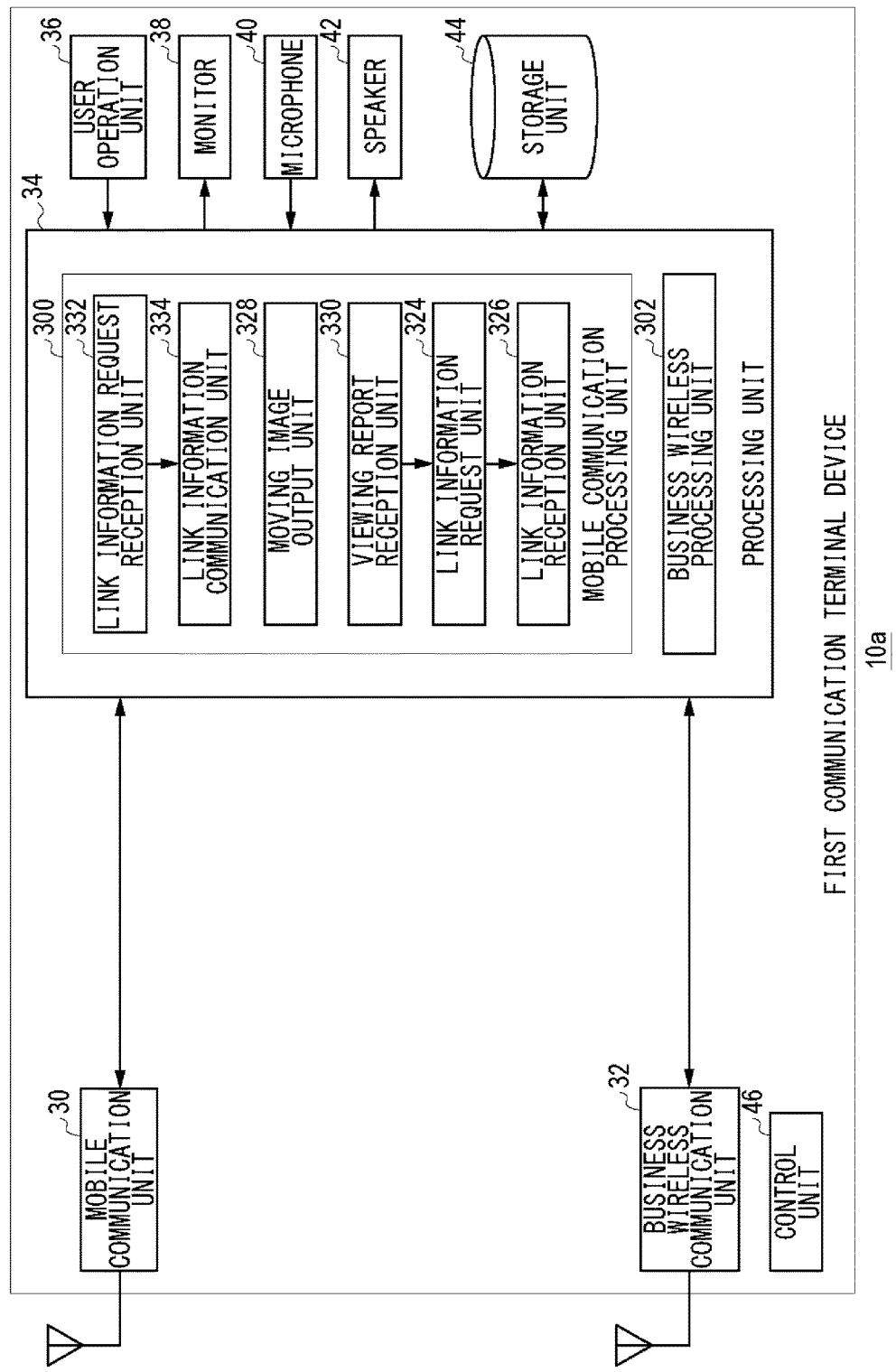
FIG. 28 shows the features of the first communication terminal device according to Embodiment 6.

FIG. 28 shows the features of the first communication terminal device 10a according to Embodiment 6. The mobile communication processing unit 300 includes a link information request reception unit 332, a link information communication unit 334, the moving image output unit 328, the viewing report reception unit 330, the link information request unit 324, and the link information reception unit 326. The first communication terminal device 10a runs the server function in the streaming of moving images and originates a call in business wireless communication. Streaming in Embodiment 3 is broadcast transmission. The mobile communication unit 30 through the control unit 46 are as shown in FIG. 2 so that a description thereof is omitted.

Figure 29:
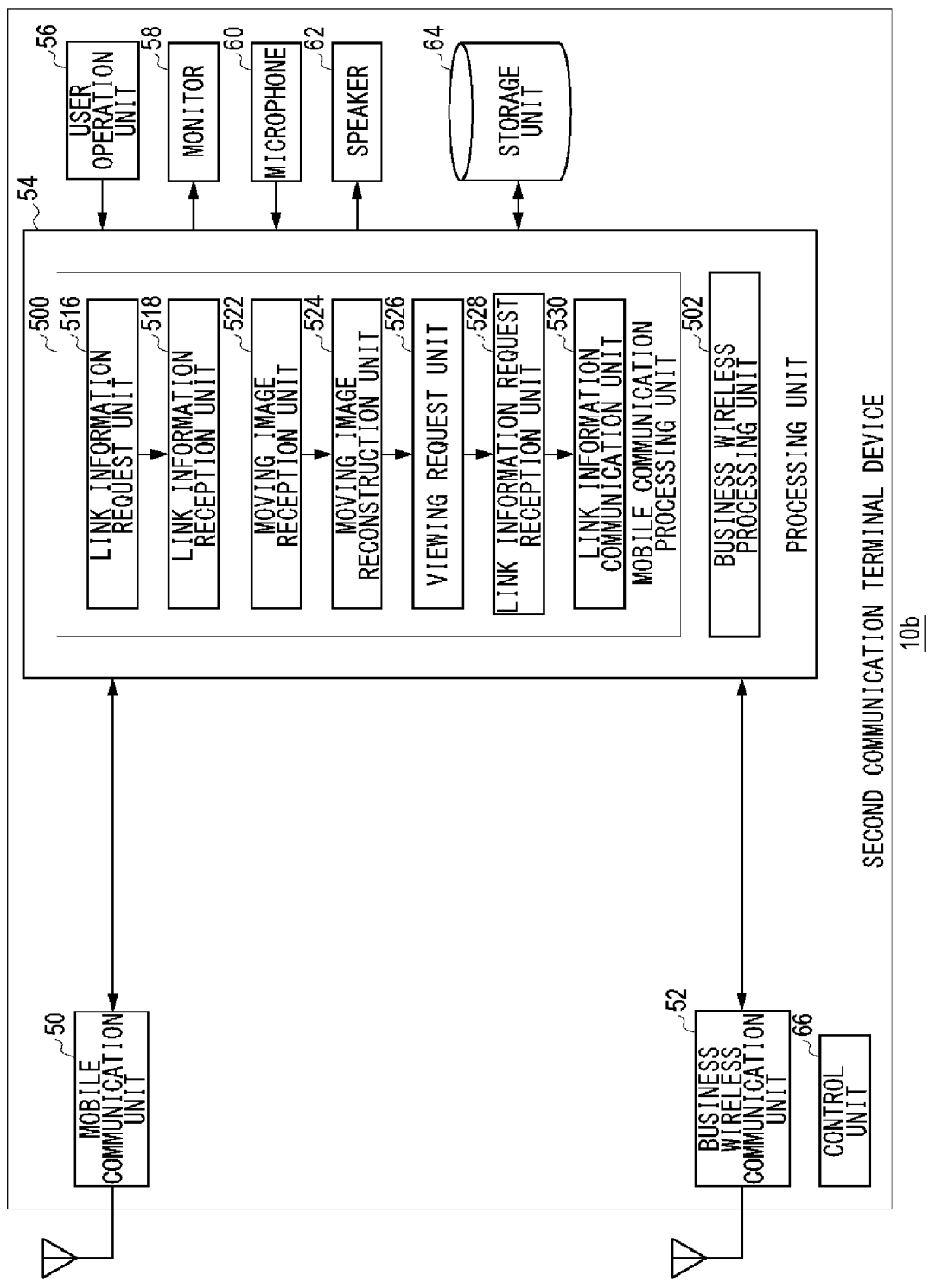
FIG. 29 shows the features of the second communication terminal device according to Embodiment 6.

FIG. 29 shows the features of the second communication terminal device 10b according to Embodiment 6. The mobile communication processing unit 500 includes the link information request unit 516, the link information reception unit 518, the moving image reception unit 522, the moving image reconstruction unit 524, the viewing report unit 526, the link information request reception unit 528, and the link information communication unit 530. The second communication terminal device 10b runs the client function in the streaming of moving images and receives a call in business wireless communication. The mobile communication unit 50 through the control unit 66 are as shown in FIG. 3 so that a description thereof is omitted.

A description will be given of processes in the processing unit 34 in the first communication terminal device 10a and the processing unit 54 in the second communication terminal device 10b. The monitor 58 of the second communication terminal device 10b displays a screen for prompting the user to enter an instruction. When the user selects moving images, the link information request unit 516 of the second communication terminal device 10b requests the first communication terminal device 10a to transmit link information using mobile communication. This causes a link information request to be transmitted to the first communication terminal device 10a. The link information request reception unit 332 of the first communication terminal device 10a receives the link information from the second communication terminal device 10b using mobile communication. The link information communication unit 334 of the first communication terminal device 10a transmits the link information of the first communication terminal device 10a to the second communication terminal device 10b using mobile communication.

The link information reception unit 518 of the second communication terminal device 10b receives the link information from the first communication terminal device 10a using mobile communication. Receiving the link information, the link information reception unit 518 stores the link information in the storage unit 64. The moving image output unit 328 of the first communication terminal device 10a broadcasts the moving image data stored in the storage unit 44.

The moving image reception unit 522 of the second communication terminal device 10b receives the moving image data broadcast from the first communication terminal device 10a using mobile communication, based on the received link information, and, more particularly, the IP address (first information). The moving image reception unit 522 outputs the received moving image data to the moving image reconstruction unit 524. The moving image reconstruction unit 524 of the second communication terminal device 10b reconstructs the moving image data from the moving image reception unit 522 and displays the reconstructed moving image data on the monitor 58. When the moving image reconstruction unit 524 reconstructs the moving image data, the viewing report unit 526 of the second communication terminal device 10b transmits a moving image viewing report to the first communication terminal device 10a using mobile communication to notify the first communication terminal device 10a accordingly. Receiving the moving image viewing report from the second communication terminal device 10b, the viewing report reception unit 330 of the first communication terminal device 10a recognizes that the second communication terminal device 10b is reconstructing the moving image data.

When the viewing report reception unit 330 receives the moving image viewing report, the link information request unit 324 of the first communication terminal device 10a requests the second communication terminal device 10b to transmit link information using mobile communication. This causes a link information request to be transmitted to the second communication terminal device 10b. The link information request reception unit 528 of the second communication terminal device 10b receives the link information request from the first communication terminal device 10a using mobile communication. The link information communication unit 530 of the second communication terminal device 10b transmits the link information of the second communication terminal device 10b to the first communication terminal device 10a using mobile communication. The link information reception unit 326 of the first communication terminal device 10a receives the link information from the second communication terminal device 10b using mobile communication. Receiving the link information, the link information reception unit 312 stores the link information in the storage unit 44.

Thus, the first communication terminal device 10a delivers the moving image data by broadcasting it using mobile communication and receives a moving image viewing report using mobile communication. When a destination of voice transmission is selected and PTT is initiated by a user operation in order to transmit voice to the destination of delivery of moving images in this situation, the business wireless processing unit 302 performs voice transmission. Voice communication using business wireless communication is as described above and a description thereof is omitted.

Figure 30:
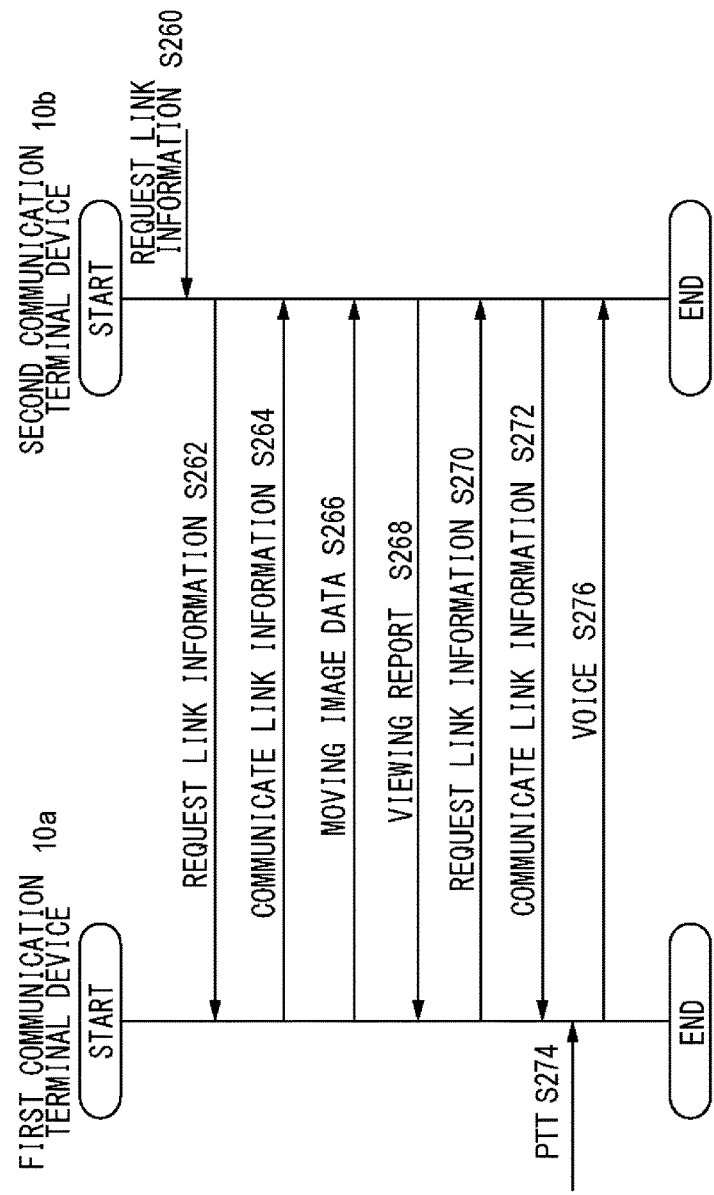
FIG. 30 is a sequence diagram showing the steps of communication in the communication system according to Embodiment 6.

FIG. 30 is a sequence diagram showing the steps of communication in the communication system 100 according to Embodiment 6. A link information request is entered in the second communication terminal device 10b (S260). The second communication terminal device 10b transmits a link information request to the first communication terminal device 10a (S262). The first communication terminal device 10a communicates the link information to the second communication terminal device 10b (S264). The first communication terminal device 10a transmits the moving image data to the second communication terminal device 10b (S266). The second communication terminal device 10b transmits the viewing report to the first communication terminal device 10a (S268). The first communication terminal device 10a transmits a link information request to the second communication terminal device 10b (S270). The second communication terminal device 10b communicates the link information to the first communication terminal device 10a (S272). The button in the user operation unit 36 in the first communication terminal device 10a is pressed for PTT (S274). The first communication terminal device 10a transmits voice to the second communication terminal device 10b (S276).

According to the embodiment, the link information on the second communication terminal device is received. Therefore, in originating a call to the second communication terminal device using business wireless communication while the moving image data is being broadcast using mobile communication to the second communication terminal device, the wireless CH of the second communication terminal device can be identified based on the second information in the link information. Since the wireless CH of the second communication terminal device is automatically identified while the moving image data is being broadcast using mobile communication, the user operation is prevented from becoming too complicated in a device compatible with a plurality of communication schemes. Further, since the viewing report is received, the communication terminal device reconstructing the broadcast moving image data can be recognized. Since the link information is directly transmitted between communication terminal devices, the server device is made unnecessary. Since the server device is made unnecessary, the configuration can be simplified.

Described above is an explanation based on an exemplary embodiment. The embodiment is intended to be illustrative only and it will be obvious to those skilled in the art that various modifications to constituting elements and processes could be developed and that such modifications are also within the scope of the present invention.

In Embodiments 1-6, delivery of moving images using mobile communication is described. The embodiments may not be as described. For example, the service provided by mobile communication may not be delivery of moving images. To describe it more specifically, data generated in a device capable of detecting abnormality in the environment such as a thermal camera (detection of abnormal temperature), a smoke detection device (detection of abnormal ambient air), a gas sensor device (detection of abnormal carbon monoxide level, detection of abnormal hazardous gas (e.g., hydrogen) level)) may be delivered. According to this variation, various information can be delivered using mobile communication.

In Embodiments 1 through 6, it is described that mobile communication is defined as the first communication where business wireless communication is defined as the second communication scheme. Alternatively, the first communication scheme may not be mobile communication but may be wired communication. According to this variation, various communication schemes can be applied as the first communication scheme.

In Embodiments 1 through 3, the moving image data is delivered via the server device 20. Alternatively, the moving image data may not be mediated by the server device 20 and may be delivered between the first communication terminal device 10a and the second communication terminal device 10b. According to this variation, the processing volume of the server device 20 can be reduced.

In Embodiments 4 through 6, the link information is transmitted between the first communication terminal device 10a and the second communication terminal device 10b. Alternatively, the link information may be stored in the storage unit 44 of the first communication terminal device 10a and the storage unit 64 of the second communication terminal device 10b. According to this variation, the step of requesting the link information and the step of communicating the link information can be eliminated.

Referring to FIG. 12 of Embodiment 1, steps 22 through 28 are performed after steps 10 through 18. Alternatively, steps 22 through 28 may be performed before steps 10 through 18. Referring to FIG. 18 of Embodiment 2, steps 126 through 138 are performed after steps 110 through 122. Alternatively, steps 126 through 138 may be performed before steps 110 through 122. Referring to FIG. 21 of Embodiment 3, steps 174 through 184 are performed after steps 160 through 172. Alternatively, steps 174 through 184 may be performed before steps 160 through 172. Referring to FIG. 24 of Embodiment 4, steps 208 through 210 are performed after steps 200 through 204. Alternatively, steps 208 through 210 may be performed before steps 200 through 204. Referring to FIG. 27 of Embodiment 5, step 244 is performed after steps 230 through 242. Alternatively, step 244 may be performed before steps 230 through 242. Referring to FIG. 30 of Embodiment 6, steps 266 through 272 are performed after steps 260 through 264. Alternatively, steps 266 through 272 may be performed before steps 260 through 264. According to this variation, the flexibility of the system can be improved.

What is claimed is:

1. A communication terminal device comprising:

a first communication module that performs communication using a first communication scheme;

a second communication module that performs communication using a second communication scheme different from the first communication scheme;

a storage unit that stores first information and second information as link information that maps the first information and the second information to each other, the first information defining the communication terminal device and the first communication module of the communication terminal device, and the second information defining the second communication module of the communication terminal device; and a processing unit that communicates, while service from a further communication terminal device is being received via the first communication module, with the further communication terminal device based on the second information by referring to the link information, wherein the processing unit acquires, based on the first information on the further communication terminal device providing the service, the second information corresponding to the first information by referring to the link information, and communicates with the further communication terminal device based on the second information by using the second communication module, wherein the service that the first communication module receives is delivery of moving images, wherein communication using the second communication scheme performed in the second communication module is voice communication using a business wireless communication scheme, and wherein the first information stored as the link information in the storage unit is address information of an internet protocol, and the second information stored as the link information in the storage unit includes information on a channel type in the business wireless communication scheme and identification information.

2. A communication terminal device comprising:

a first communication module that performs communication using a first communication scheme;

a second communication module that performs communication using a second communication scheme different from the first communication scheme;

a storage unit that stores first information and second information as link information that maps the first information and the second information to each other, the first information defining the communication terminal device and the first communication module of the communication terminal device, and the second information defining the second communication module of the communication terminal device; and a processing unit that communicates, while service is being provided to a further communication terminal device via the first communication module, with the further communication terminal device based on the second information by referring to the link information, wherein the processing unit acquires, based on the first information on the further communication terminal device receiving the service, the second information corresponding to the first information by referring to the link information, and communicates with the further communication terminal device based on the second information by using the second communication module, wherein the service that the first communication module receives is delivery of moving images, wherein communication using the second communication scheme performed in the second communication module is voice communication using a business wireless communication scheme, and wherein the first information stored as the link information in the storage unit is address information of an internet protocol, and the second information stored as the link information in the storage unit includes information on a channel type in the business wireless communication scheme and identification information.

3. A communication system comprising:
a first communication terminal device capable of performing communication using a first communication scheme and a second communication scheme that are mutually different;
a second communication terminal device capable of performing communication using the first communication scheme and the second communication scheme; and
a server device capable of communicating with the first communication terminal device and the second communication terminal device,
- wherein the server device stores link information that maps first information and second information for each communication terminal device, the first information being defined to provide service using the first communication scheme, and the second information being defined to perform communication using the second communication scheme,
- wherein when receiving service from the second communication terminal device using the first communication scheme, the first communication terminal device acquires the link information related to the second communication terminal device from the server device using the first communication scheme and communicates with the second communication terminal device using the second communication scheme based on the second information on the second communication terminal device included in the link information acquired from the server device,
- wherein the service received using the first communication scheme is delivery of moving images,
- wherein communication using the second communication scheme is voice communication using a business wireless communication scheme, and
- wherein the first information included in the link information that the first communication terminal device acquires from the server device is address information of an internet protocol, and the second information included in the link information includes information on a channel type in the business wireless communication scheme and identification information.

* * * * *